US008276080B2

(12) United States Patent
Tatsubori

(10) Patent No.: US 8,276,080 B2
(45) Date of Patent: Sep. 25, 2012

(54) AUTOMATICALLY GENERATING A REFERENCE MARK IN VIRTUAL SHARED SPACE

(75) Inventor: Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 12/197,173

(22) Filed: Aug. 22, 2008

(65) Prior Publication Data

US 2009/0132931 A1 May 21, 2009

(30) Foreign Application Priority Data

Nov. 15, 2007 (JP) ................................. 2007-296861

(51) Int. Cl.
*G06F 3/00* (2006.01)
(52) U.S. Cl. ........ 715/751; 715/230; 715/757; 715/782; 715/706; 345/473; 717/139; 709/206
(58) Field of Classification Search .................. None
See application file for complete search history.

(56) References Cited

U.S. PATENT DOCUMENTS

| | | | | |
|---|---|---|---|---|
| 5,813,007 | A * | 9/1998 | Nielsen .......................... | 709/206 |
| 6,366,285 | B1 * | 4/2002 | Brush et al. ................... | 345/473 |
| 7,836,437 | B2 * | 11/2010 | Kacmarcik .................... | 717/139 |
| 7,933,395 | B1 * | 4/2011 | Bailly et al. .................. | 715/782 |
| 2002/0016786 | A1 * | 2/2002 | Pitkow et al. ..................... | 707/3 |
| 2002/0158916 | A1 * | 10/2002 | Gusler et al. .................. | 345/850 |
| 2002/0178072 | A1 * | 11/2002 | Gusler et al. .................... | 705/26 |
| 2004/0003352 | A1 * | 1/2004 | Bargeron et al. ............. | 715/530 |
| 2007/0238520 | A1 | 10/2007 | Kacmarcik | |
| 2008/0235570 | A1 * | 9/2008 | Sawada et al. ................ | 715/230 |
| 2008/0263460 | A1 * | 10/2008 | Altberg et al. ................ | 715/757 |

FOREIGN PATENT DOCUMENTS

CN 1218238 A 6/1999

OTHER PUBLICATIONS

Secon Life Tutorial, Jun. 20, 2003, pp. 66-67.*
Second Life Tutorial, Jun. 20, 2003, pp. 66-67.*

* cited by examiner

*Primary Examiner* — Boris Pesin
*Assistant Examiner* — Ayesha Huertas Torres
(74) *Attorney, Agent, or Firm* — Shimokaji & Assoc., PC

(57) ABSTRACT

The present invention discloses a method and apparatus for automatically putting a reference mark on an object to pay attention to. A server device which provides a virtual reality space to multiple client devices connected to the server device via a network detects movement of an avatar related to a client device, the movement indicating an object in the virtual reality space displayed on a screen of the client device, as a trigger for generating a reference mark. In response to detection of the movement of the avatar, the server device generates a reference mark to be put on the object. The server device notifies another client device of the presence of the generated reference mark. Accordingly, the other client device is guided to the object by selecting the notification displayed on the screen.

16 Claims, 18 Drawing Sheets

(a)

| AVATAR ID | POSITION (x,y,z) | DIRECTION | 3D MODEL DATA |
|---|---|---|---|
| 2000 | (300, 50, 250) | VISUAL LINE VECTOR #1 | a_data#1 |
| ... | ... | ... | ... |
| 2334 | (325, 234, 323) | VISUAL LINE VECTOR #M | a_data#M |
| ... | ... | ... | ... |

(b)

| OBJECT ID | POSITION (x,y,z) | DIRECTION | 3D MODEL DATA |
|---|---|---|---|
| 5000 | (310, 50, 250) | DIRECTION VECTOR #1 | o_data#1 |
| ... | ... | ... | ... |
| 5015 | (390, 234, 323) | DIRECTION VECTOR #N | o_data#N |
| ... | ... | ... | ... |

FIG. 3

| REFERENCE MARK ID | CREATION TIME | FINAL REFERENCE TIME | REFERENCE FREQUENCY | OBJECT | | CREATOR | | | | CONTEXT | |
|---|---|---|---|---|---|---|---|---|---|---|---|
| | | | | OBJECT ID | POINTING POSITION (x,y,z) | CREATOR ID | POSITION (x,y,z) | DIRECTION | TYPE | VALUE |
| 1001 | 2007-09-05 10:20:30 | 2007-09-05 10:21:20 | 8 | 5432 | (30, 120, 30) | 2334 | (325, 234, 323) | VISUAL LINE VECTOR #2 | TEXT | <text data> |
| 1102 | 2007-09-05 10:21:00 | 2007-09-05 10:21:30 | 2 | 5732 | (60, 60, 67) | 2334 | (324, 54, 234) | VISUAL LINE VECTOR #3 | STAY | — |
| 1343 | 2007-09-05 10:23:45 | 2007-09-05 10:27:00 | 20 | 5432 | (60, 240, 25) | 2345 | (355, 342, 32) | VISUAL LINE VECTOR #10 | VOICE | <sound data> |
| ⋮ | ⋮ | ⋮ | ⋮ | ⋮ | ⋮ | ⋮ | ⋮ | ⋮ | ⋮ | ⋮ |

FIG. 5

Ignore <Avatar ID> <Action>
Ignore 1234 VOICE
Ignore 1233 TEXT
Ignore 1232 STAY (a)

SetAvatorPriority <Avatar ID> <Priority>
SetAvatarPriority 1234 IGNORE/LOW/MIDDLE/HIGH (b)

SetActionPriority <ActionType> <Priority>
SetActionPriority MSG-DP/STAY/VOICE IGNORE/LOW/MIDDLE/HIGH (c)

FIG. 7

(a) SALESMAN'S COMPUTER DISPLAY SCREEN (b) SALESMAN'S COMPUTER DISPLAY SCREEN (c) SALESMAN'S COMPUTER DISPLAY SCREEN (a) GRANDPA'S COMPUTER DISPLAY SCREEN (b) GRANDPA'S COMPUTER DISPLAY SCREEN (c) GRANDPA'S COMPUTER DISPLAY SCREEN

AUTOMATICALLY GENERATING A REFERENCE MARK IN VIRTUAL SHARED SPACE

CROSS REFERENCE TO RELATED APPLICATIONS

This application claims the benefit of Japanese Patent Application No. 2007-296861, filed Nov. 15, 2007, which is incorporated by reference.

BACKGROUND OF THE INVENTION

The present invention relates to object reference in a virtual shared space and, more particularly, to a technique of automatically putting a reference mark on an object to pay attention to.

A service to provide an online virtual reality world created by three-dimensional computer graphics has recently attracted attention. Each user of the service accesses the virtual reality world by connecting to a host server via a network such as the Internet from a computer having dedicated client software installed therein. In the virtual reality world, the user of the service performs activities by operating an avatar representing the user. For example, through the avatar, the user of the service can look around a streetscape or buildings created in the virtual reality world, perform a business transaction there, or enjoy conversations with other users the user meets.

In the real world, when people have a conversation by referring to something, they often try to let the other person know an object they are referring to with gestures such as pointing. Also in a three-dimensional virtual reality world, the user can indicate a specific object by making the user's avatar take a specific posture or by using reference terms in a message. Such a way of communication does not, however, always function as well as in the real world. This can be, for example, because the users accessing the virtual reality world may see different images from each other when a view of the virtual reality world seen from the avatar of each of the users is displayed on a computer screen of each user.

It is also conceivable to put a mark on an object to be referred to so as to allow the other person to easily identify the object in the virtual reality world. For example, Japanese Patent Application Publication No. 2006-212423 discloses a technique of: designating an object by receiving a command from a user to designate the object; and associating selected information with the object by receiving a command from the user to associate the selected information with the object. By use of this technique, the user designates, for example, a window, associates a reference mark therewith, and also displays a text "caution sniper" near the window. Thus, the user can allow different players to easily identify the window and know associated information.

However, the above technique disclosed in Japanese Patent Application Publication No. 2006-212423 is aimed at object reference in a three-dimensional game in which the same target is set for the player. Thus, it is difficult to effectively utilize the above technique of putting the reference mark in a more versatile three-dimensional virtual reality world in which each person freely performs activities, such as SECOND LIFE® (trademark of Linden Research, Inc.) operated by Linden Lab, Inc. This is because, in the more versatile three-dimensional virtual reality world, an object that one user wishes to focus attention on does not necessarily agree with an object that a different user is interested in, since sense of purpose and background knowledge differ among the users. As a result, all the hard work for putting reference marks can go to waste in some cases, or no reference marks are actually put on what a user is interested in, in other cases.

It is also possible to cope with the problem described above by putting reference marks on each and every object. However, the user has to input a considerable number of commands to put the reference marks. Thus, such a method is not a realistic solution. Moreover, even if a reference mark is put on the object the user is interested in, the user never even notices the reference mark unless the object having the reference mark put thereon is displayed on the computer screen of the user.

SUMMARY OF THE INVENTION

According to one embodiment of the present invention, a server device which provides a virtual reality space for a plurality of client devices connected to the server device via a network, comprises: a movement detection part which detects movement of an avatar related to a client device of the plurality of client devices, the movement indicating an object in the virtual reality space displayed on a screen of the client device; and a reference mark generation part which generates a reference mark to be put on the object in response to detection of the movement.

According to another embodiment of the present invention, a method is disclosed for automatically generating a reference mark, the method being executed in a server device providing a virtual reality space for a plurality of client devices connected to the server device via a network, and the method comprising the steps of: detecting movement of an avatar related to a client device, the movement indicating an object in the virtual reality space displayed on a screen of the client device; and generating a reference mark to be put on the object in response to detection of the movement.

According to still another embodiment of the present invention, a server program for automatically generating a reference mark is disclosed, the server program being executed in a server device providing a virtual reality space for a plurality of client devices connected to the server device via a network, and the server program causing the server device to execute the steps of: detecting movement of an avatar related to a client device, the movement indicating an object in the virtual reality space displayed on a screen of the client device; and generating a reference mark to be put on the object in response to detection of the movement.

According to yet another embodiment of the present invention, a computer program product for automatically generating a reference mark is disclosed for use in a system including: a server device providing a virtual reality space and at least one client device connected to the server device via a network, the computer program product comprising a computer useable medium including a computer readable program, wherein the computer readable program when executed on a computer causes: each client device to execute the steps of: detecting an event caused by an input from a user of the client device, the input indicating an object in the virtual reality space displayed on a screen of the client device; and notifying the server device of information on the detected event as trigger information for the server device to generate a reference mark to be put on the object, in response to detection of the event, and causes the server device to execute the step of: generating the reference mark to be put on the object in response to receipt of the event information from the client device.

These and other features, aspects and advantages of the present invention will become better understood with reference to the following drawings, description and claims.

BRIEF DESCRIPTION OF THE DRAWINGS

FIG. 3(a) shows an example of a table for management of avatar information on avatars, the avatar information being retained in the server device 200 and the client device 300, and FIG. 3(b) shows an example of a table for management of object information about different objects, the object information being retained in the server device 200 and the client device 300.

FIG. 5 shows an example of a reference mark table according to an embodiment of the present invention.

FIG. 7(a) shows an example of a policy according to an embodiment of the present invention, FIG. 7(b) shows an example of a policy according to an embodiment of the present invention, and FIG. 7(c) shows an example of a policy according to an embodiment of the present invention.

DETAILED DESCRIPTION OF THE INVENTION

Figure 1:
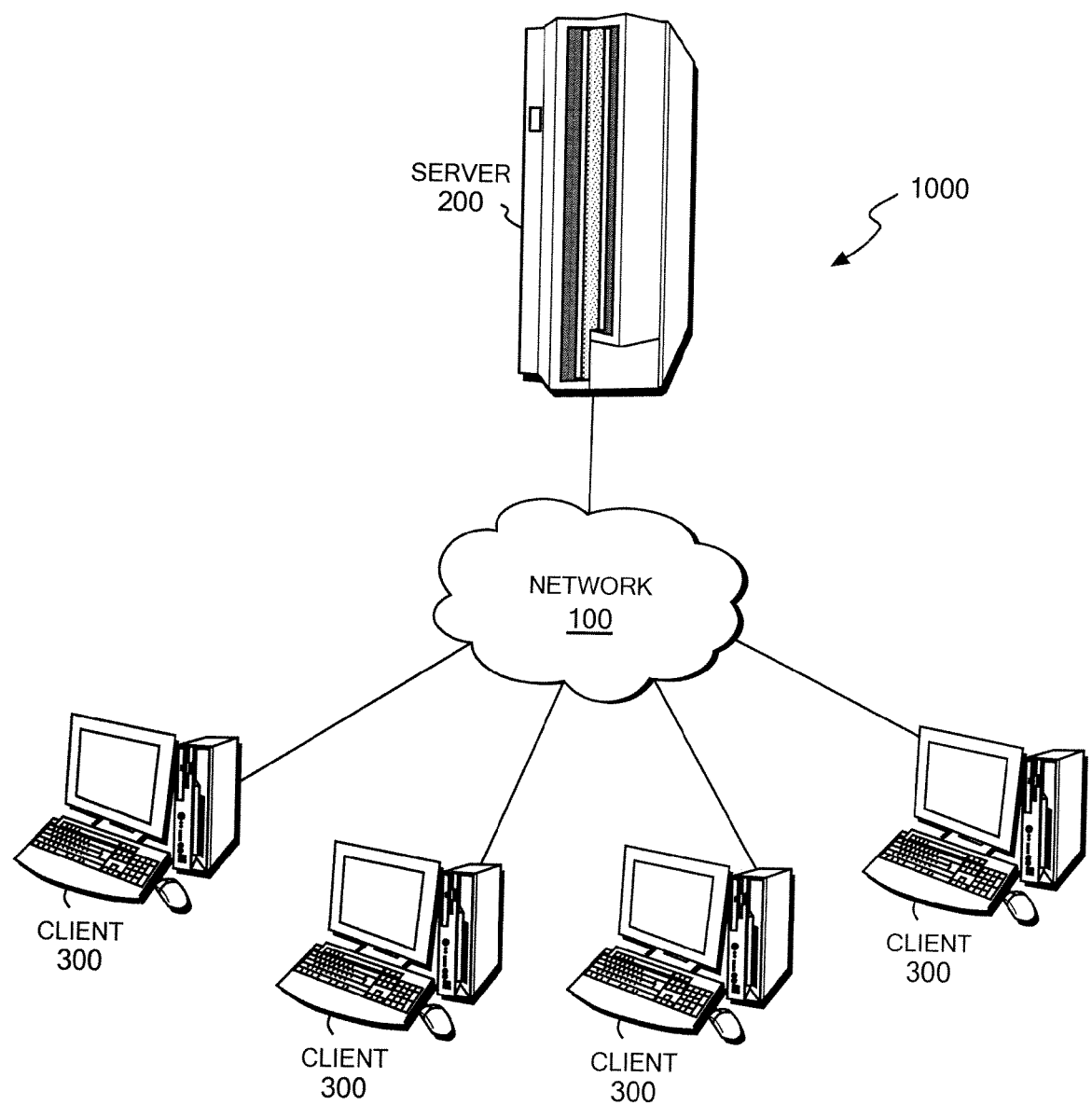
FIG. 1 shows an example of an entire configuration of a system 1000 for automatically generating a reference mark according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims. However, the following embodiments are not intended to limit the present invention according to claims, and all combinations of features described in the embodiment are not necessarily essential to the solving means of the present invention. Note that the same elements are denoted by the same reference numerals throughout the description of the embodiments.

Broadly, embodiments of the present invention provide a method and apparatus for automatically generating, by computer processing, a reference mark to be put on an object without a command from a user. Moreover, embodiments also enable a user of a different client device to know the presence of the generated reference mark according to the user's interests regardless of whether or not the object having the reference mark put thereon is displayed on a screen. Furthermore, embodiments further enable a user of a different client device to see an object having a reference mark put thereon when having an interest in a notification of the reference mark, even while the object having the reference mark put thereon is not displayed on the screen of the different client device.

Embodiments may be implemented by use of a server device which provides a virtual reality space for multiple client devices connected to the server device via a network. The server device may include: a movement detection part which detects movement of an avatar related to a client device, the movement indicating an object in the virtual reality space displayed on a screen of the client device; and a reference mark generation part which generates a reference mark to be put on the object in response to detection of the movement of the avatar.

The movement of the avatar detected here is not limited to movement indicating the object by use of a body part of the avatar, such as a finger and a hand but may also include movement indicating the object by use of a tool such as a stick or a beam. Furthermore, the movement detection part may detect a state where a certain object is indicated by directing a visual line of the avatar toward the object. Moreover, the reference mark generated by the server device may be a visible reference mark that can be actually seen on the screen of the client device, or may be an invisible reference mark that cannot be actually seen. In either case, the server device may generate the reference mark by assigning an ID as an identifier to the reference mark, and by maintaining the ID so as to be related to the object having the reference mark put thereon.

It is desirable that the movement detection part detect a state where an input from the user of the client device allows the avatar to indicate the object for at least a certain period of time. By using a condition that the object is indicated for at least a certain period of time, the server device no longer erroneously generates a reference mark in response to movement of the avatar or the user operation to select the object for purposes other than indicating the object.

Moreover, it is desirable that the movement detection part detect a state where predetermined keywords are included in a chat message input by the user of the client device in the state where the input from the user of the client device allows the avatar to indicate the object.

Here, the predetermined keywords may be, for example, demonstrative pronouns such as "this", "there" and "over there". By using a condition that not only the object is indicated by the avatar but also the predetermined keywords are included in the chat message input by the user, the server device no longer erroneously generates a reference mark in response to a user operation merely for looking at the object through the avatar.

Moreover, it is desirable that the server device include: a message acquisition part which acquires a chat message input by the user of the client device before and after the object is indicated; and a reference mark storage part which stores the acquired chat message while relating the message to the reference mark. The chat message input by the user before and after the object is indicated may likely have contents regarding the object. Thus, the server device may acquire a chat message as information for explaining the object from the client device, and retain the chat message while relating the message to the reference mark. Note that the chat message may be not only a text-based message but also a voice-based message.

Instead of or in addition to the above, the server device may include a reference mark storage part which stores at least one of: a creation time of the reference mark; information about the object on which the reference mark is to be put; movement information about the movement of the avatar based on which the reference mark is generated; and avatar information about the avatar who has performed the movement, while relating at least one of the above to the generated reference mark.

Moreover, it is desirable that the server device further include: a policy acquisition part which may acquire a policy that defines a reference mark whose presence is wished to be notified, the policy being registered in advance in the server device by a different client device; and a reference mark notification part which may select a reference mark that meets the policy from the generated reference marks by referring to the policy, and which notifies the other client device of the presence of the selected reference mark. Thus, it is possible for the user of the other client device to recognize the presence of the reference mark automatically generated for the object the user is interested in, even if the object having the generated reference mark put thereon is not displayed on the screen of the other client device.

Alternatively, the server device may further include a reference mark notification part which transmits to the other client device a notification indicating the presence of the generated reference mark, the notification including at least one of: creation time of the reference mark; information about the object on which the reference mark is to be put; movement information about the movement of the avatar based on which the reference mark is generated; and avatar information about the avatar who has performed the movement. Thus, it is possible for the user of the other client device to recognize the presence of the automatically generated reference mark and to determine whether or not the user is interested therein, even if the object having the generated reference mark put thereon is not displayed on the screen of the different client device.

Moreover, it is desirable that the server device further include: a reference mark storage part which stores a reference frequency indicating the number of times the reference mark is referred to or final reference time indicating the time at which the reference mark was last referred to, while relating any of the above to the generated reference mark; a reference mark notification part which notifies the other client device of the presence of the generated reference mark together with information on the reference frequency or the final reference time; an operation information acquisition part which acquires from the other client device an event of a selection operation which a user of the other client device, in response to the reference mark notification, displayed on the screen of the other client device; and an updating part which updates the reference frequency or the final reference time in response to receipt of the event of the selection operation.

By providing the user of the other client device with the information on the reference frequency or the final reference time, the user can recognize the popularity of the object having the automatically generated reference mark put thereon. Moreover, the user can use the provided information as a piece of information for determining whether or not to see the object having the reference mark put thereon.

Furthermore, it is desirable that the server device include a discarding part which discards at least one of a reference mark that is less frequently referred to, a reference mark left for a certain period of time after the generation thereof and a reference mark left for a certain period of time after the final reference time. Thus, unpopular reference marks or old reference marks can be prevented from remaining on the object for a long time.

Moreover, it is desirable that the server device include: a reference mark notification part which notifies the other client device of the presence of the generated reference mark; an operation information acquisition part which acquires from the other client device an event of a selection operation which a user of the other client device performs in response to the reference mark notification displayed on the screen of the other client device; and an updating part which updates at least one of a positional information and a visual line information on a different avatar related to the other client device so as to guide the avatar to the object having the reference mark put thereon, in response to receipt of the event of the selection operation.

Thus, even if the object having the generated reference mark put thereon is not displayed on the screen of the other client device, the user of the other client device can see the corresponding object on the user's own screen, because the current position or visual line of the avatar may be updated only by selecting the reference mark notification displayed on the screen.

Although embodiments have been described above as the server device, embodiments of the present invention can also be grasped as a method and a program for automatically generating a reference mark, both of which method and program may be executed in the server device as described above.

Other embodiments can be understood as a program for automatically generating a reference mark, which may be executed in a system including a server device which provides a virtual reality space and one or more client devices connected to the server device via a network. This program allows each client device to execute the steps of: detecting an event caused by an input from a user of the client device, the input indicating an object in the virtual reality space displayed on a screen of the client device; and notifying the server device of information on the detected event as trigger information for the server device to generate a reference mark to be put on the object in response to detection of the event. Moreover, the program may allow the server device to execute the step of generating the reference mark to be put on the object in response to receipt of the event information from the client device.

It is desirable that the detection step include the step of detecting a state where the object displayed on the screen of the client device is indicated by an input from the user for at least a certain period of time. Instead of or in addition to the above, the detection step may include the step of detecting a state where predetermined keywords are included in a chat message that is input by the user in the state where the object is indicated by the avatar related to the client device.

Moreover, it is desirable that the program allow the client device to execute the step of acquiring a chat message that is input to the client device by the user before and after the object is indicated. In this case, the acquired chat message may be notified while being included in the information on the detected event to the server device.

Moreover, it is desirable that the program allow the client device to execute the steps of: generating a policy that defines a reference mark whose presence is wished to be notified based on an input from the user; and registering the generated policy in the server device. The policy to be generated can include, for example, conditions for types of the event based on which the reference mark is generated, conditions for the client device which transmits event information, and conditions for the time when the reference mark is generated. However, the policy is not limited to the above. Moreover, the policy may define the reference mark whose presence is wished to be notified by defining a reference mark whose presence is not wished to be notified.

Moreover, it is desirable that the program allow the server device to further execute the step of: selecting, from the generated reference marks, a reference mark that meets the policy by referring to the policy; and notifying the client device of the presence of the selected reference mark. Moreover, the program may allow the client device to further execute the step of: highlighting or hiding, on the screen, a notification indicating the presence of the reference mark that is received from the server device by referring to preference information registered in advance in the client device by the user.

Here, the preference information to be registered may be about the highlighting of at least one of the following reference marks as a priority. Specifically, the reference marks to be highlighted may include: a last generated reference mark; a reference mark referred to by another, possibly different, user; and a reference mark generated based on an event that is generated by the client device related to an avatar with whom the last conversation is held in the virtual reality space, or to an avatar present around the avatar of the client device.

Moreover, it is desirable that the program allow the server device to further execute the step of: selecting, from the generated reference marks, a reference mark that meets the policy by referring to the policy; and notifying the client device of the presence of the selected reference mark. Moreover, the program may allows the client device to execute the steps of: displaying on the screen a notification indicating the presence of the reference mark that is received from the server device; detecting a selection operation by the user in response to the notification displayed on the screen; and updating at least one of positional information and visual line information on the avatar related to the client device so as to guide the avatar to the object having the reference mark put thereon, the reference mark corresponding to the selected notification, in response to detection of the selection operation.

Furthermore, it is desirable that the notification indicating the presence of the reference mark include at least one of: information about the object having the reference mark put thereon; and information about the avatar related to the client device that has transmitted to the server device the event based on which the reference mark is generated. Moreover, the updating step may include the step of updating at least one of the positional information and visual line information of the avatar, based on the information about the object or the information about the avatar included in the notification. This configuration may be desirable in terms of scalability, as compared with a configuration in which calculation processing for updating at least one of the positional information and visual line information on the avatar is performed in the server device.

FIG. 1 shows an example of an entire configuration of a system 1000 for automatically generating a reference mark according to an embodiment of the present invention. The system 1000 may include: a server device 200 connected to a network 100 such as the Internet and a LAN (Local Area Network), and which provides a virtual reality space for multiple client devices 300. Multiple client devices 300 may be connected to the network 100 and perform their activities in the virtual reality space provided by the server device 200.

The server device 200 may provide the following service to the client devices 300. Specifically, the server device 200 may display a three-dimensional virtual reality space within which a user of each of the client devices 300 can freely move about by operating the user's avatar. Moreover, the user can refer to or operate various objects provided by individuals or companies, and also enjoy chatting with users of the different client devices 300.

The client devices 300 may be connected to the server device 200 via the network 100, and may receive various services in a three-dimensional virtual reality world provided by the server device 200.

The server device 200 according to the embodiment of the present invention may provide the following new services in addition to the various services described above.

(1) Automatically generating a reference mark to be put on an object by using movement of an avatar as a trigger, the movement indicating the object in the three-dimensional virtual reality space.
(2) Notifying the client device 300 of the presence of the generated reference mark based on the user's interest.
(3) Guiding the avatar (the client device) to an object corresponding to the notification of the presence of the reference mark selected in the client device.
(4) Automatically discarding the generated reference mark.

Each of the client devices 300 of system 1000 may perform the following functions to receive the new services described above.

(1) Detecting movement of an avatar, the movement indicating an object in the three-dimensional virtual reality space, and notifying the server device 200 of the detection.
(2) Creating a policy that defines a reference mark whose presence is wished to be notified and registering the policy in the server device 200.
(3) Registering preference information that defines a display method and highlighting or non-highlighting notification of the reference mark according to the preference information.
(4) Detecting a selection operation for the notification of the reference mark, updating avatar information in response to the detection of the selection operation and notifying the server device 200 of the updated information.

Note, however, that it is also possible to allow the server device 200 to have the function (1) and the function (4) to update the avatar information in response to the detection of the selection operation for the notification of the reference mark among the functions described above. In the case where the server device 200 is allowed to have the function (4), the client device 300 may instead have a function: to notify the server device 200 of an event of the selection operation in response to the detection of the selection operation for the notification of the reference mark; and to receive the updated information on the avatar from the server device 200.

Figure 2:
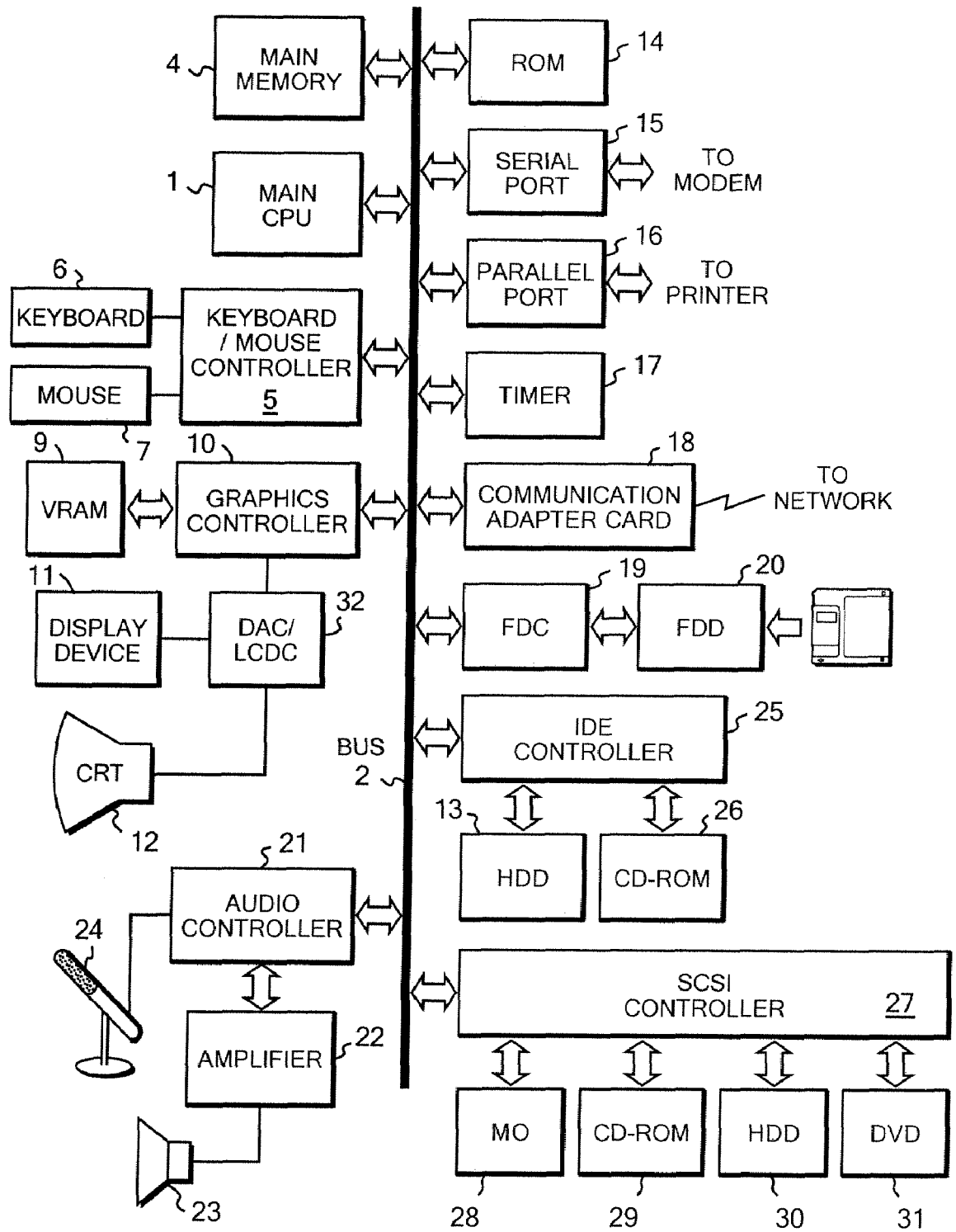
FIG. 2 shows an example of a hardware configuration of an information processor suitable for realizing a server device 200 and a client device 300 according to an embodiment of the present invention.

FIG. 2 shows an example of a hardware configuration of an information processor suitable for realizing the server device 200 and the client device 300 according to an embodiment of the present invention. The information processor may include a CPU (Central Processing Unit) 1 and a main memory 4 connected to a bus 2. Moreover, removable storages (external storage systems capable of replacing recording media) such as hard disk drives 13 and 30, CD-ROM drives 26 and 29, a flexible disk drive 20, an MO drive 28 and a DVD drive 31 may be connected to the bus 2 through a flexible disk controller 19, an IDE controller 25, a SCSI controller 27 and the like.

Storage media such as a flexible disk, an MO, a CD-ROM and a DVD-ROM are inserted into the removable storage drives. In these storage media, the hard disk drives 13 and 30 or a ROM 14, codes of computer programs for implementing the present invention by giving commands to the CPU and the like in cooperation with an operating system can be recorded.

Specifically, the various types of storage described above in the information processor as the server device 200 can store a basic program for providing the three-dimensional virtual reality space and a server program for automatically generating a reference mark for implementing the present invention. Moreover, the storage in the information processor as the client device 300 can store a dedicated program for receiving the services in the three-dimensional virtual reality space and a client program for automatically generating a reference mark for implementing the present invention. Note that the server program for implementing the present invention can also be set as a part of the basic program. Similarly, the client program for implementing the present invention can also be set as a part of the dedicated program.

The multiple computer programs described above may be loaded into the main memory 4 for execution. The computer programs can also be compressed or divided into multiple parts to be recorded on multiple media.

The storage—such as the hard disk drives 13 and 30—in the information processor as the server device 200 may also store three-dimensional image data whose state is not changed, such as a streetscape that constitutes the three-dimensional virtual reality space and data on three-dimensional objects including the avatar arranged therein. The three-dimensional objects including the avatar may be updated by the client device 300, and the updated information may be shared among the multiple client devices 300 having their avatars positioned in the same space. Thus, the storage in the server device 200 may also store avatar information (see FIG. 3(*a*)) about the avatars and object information (see FIG. 3(*b*)) about the different objects as shown in FIG. 3(*a*) and FIG. 3(*b*) in each of the regions within the three-dimensional virtual reality space, for example.

The information processor (e.g., server device 200 or client device 300) may receive inputs from input devices such as a keyboard 6 and a mouse 7 through a keyboard/mouse controller 5. The information processor may receive inputs from a microphone 24 and outputs sounds from a speaker 23 through an audio controller 21. The information processor may be connected to a display device 11 for displaying visual data to the user through a graphics controller 10. The information processor may be connected to the network through a network adapter 18 (an Ethernet® card or a token ring card) or the like, and thus can communicate with different computers and the like.

It can be understood from the above description that the information processor suitable for realizing the system 1000 according to an embodiment of the present invention can be realized by an information processor such as a general personal computer, a work station and a main frame, or by a combination thereof. However, the information processor may be required to perform three-dimensional graphics processing. Thus, it is desirable that the information processor include the graphics controller 10 having adequate level of performance and a large-capacity video memory 9.

Moreover, the information processor as the server device 200 may be required to maintain management data (see FIGS. 3(*a*) and 3(*b*)) for managing the three-dimensional image data to form the three-dimensional virtual reality space and the objects including the avatars. Thus, it is desirable that the information processor include a large-capacity storage. Although FIG. 1 shows one server device 200, the system 1000 may be configured in such a manner that, for example, multiple server devices 200 take charge of the respective regions of the three-dimensional virtual reality space, and the three-dimensional virtual reality space is, thus, provided by the multiple server devices 200. Note that the constituent elements described above are for illustrative purposes only and not all the constituent elements are necessarily essential to the present invention.

When the dedicated program is initiated by the user who wishes to receive the service in the three-dimensional virtual reality space, the client device 300 having the hardware configuration as described above may request connection to the server device 200 having the above hardware configuration through the network adapter 18. Upon receipt of the connection request, the server device 200 may read from the storage the three-dimensional image data in the region designated by the client device 300 and the data on the objects including the avatars arranged therein, and transmit the data to the client device 300 through the network adapter 18.

The client device 300 may store the received data in the main memory 4, read from the main memory 4 an image of a virtual reality space seen from its own avatar on the basis of positional information (viewpoint coordinates within the three-dimensional virtual reality space) and visual line information (visual line direction angles) on its own avatar, and display the image on the display device 11. When the avatar or object of the client device 300 is operated by the user using input devices such as the keyboard 6 and the mouse 7, the client device 300 may read from the main memory 4 data corresponding to changes made by the operation and update the contents displayed on the display device 11.

Moreover, upon receipt of a chat message input by the user using the input devices such as the keyboard 6 and the microphone 24, the client device 300 may display the chat message on the display device 11 or output the chat message from the speaker 23. Thereafter, the client device 300 may transmit the updated information on the avatar and the object as well as the chat message to the server device 200 through the network adapter 18.

The server device 200 may update the data stored in the storage on the basis of the updated information received, and may store the chat message in the storage while relating the chat message to the avatar information on the corresponding avatar. Moreover, the server device 200 may transmit the received updated information and chat message to the other client devices 300 having their avatars positioned in the same space through the network adapter 18. As described above, the server device 200 and the multiple client devices 300 connected thereto may mutually exchange information. Thus, the three-dimensional virtual reality space may be shared among the multiple client devices. The techniques applied respectively to the server device 200 and the client device 300 for providing the three-dimensional virtual reality space and enabling the users of the client devices 300 to perform their activities in the virtual reality space have become publicly known. Thus, further detailed description thereof will be omitted in the present specification.

Figure 4:
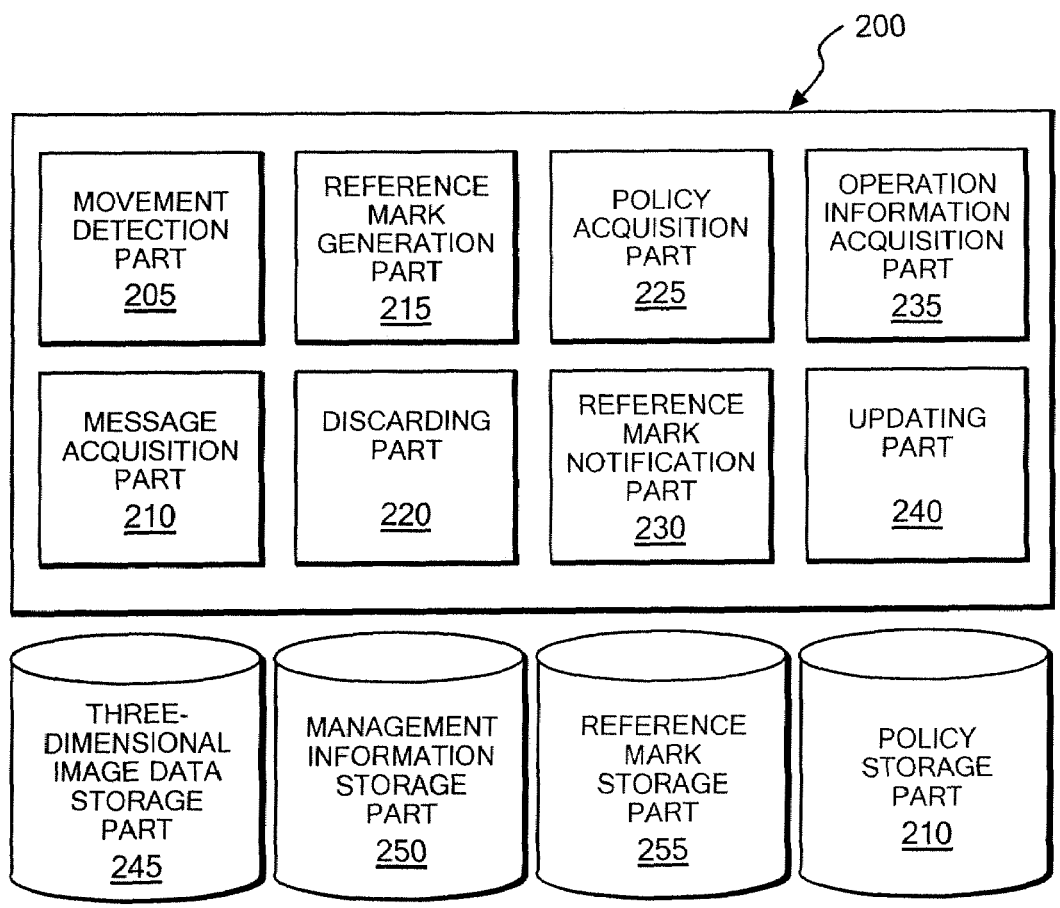
FIG. 4 shows an example of a functional configuration of the server device 200 according to an embodiment of the present invention.

FIG. 4 shows an example of a functional configuration of the server device 200 for automatically generating a reference mark according to an embodiment of the present invention. The server device 200 may include: a movement detection part 205; a message acquisition part 210; a reference mark generation part 215; a discarding part 220; a policy acquisition part 225; a reference mark notification part 230; an operation information acquisition part 235; and an updating part 240. Moreover, one or more storage devices in the server device 200 may be configured as: a three-dimensional image data storage part 245; a management information storage part 250; a reference mark storage part 255; and a policy storage part 260.

The three-dimensional image data storage part 245 may store the three-dimensional image data whose state is not changed, such as the streetscape that constitutes the three-dimensional virtual reality space as described above. The management information storage part 250 may store data on three-dimensional objects whose states can be changed and which are arranged in the three-dimensional virtual reality space. The management information storage part 250 may store the data on the three-dimensional objects, for example, by classifying the data into the avatar information about the avatars and the object information about the different objects. FIG. 3(*a*) shows a table for management of the avatar information. In the table, positional information (viewpoint coordinates within the three-dimensional virtual reality space) on the avatars, directions of the avatars, i.e., visual line information (visual line direction angles), and three-dimensional model data on the avatars may be stored so as to be related to avatar IDs, respectively. FIG. 3(*b*) shows a table for management of the information on the objects other than the avatars. In the table, positional information on the objects, direction information and three-dimensional model data on the objects may be stored so as to be related to object IDs, respectively.

The movement detection part 205 may detect movement of an avatar related to the client device 300, the movement indicating an object in the three-dimensional virtual reality space displayed on a screen of the client device 300. The movement of the avatar to be detected, the movement indicating the object in the three-dimensional virtual reality space, may be one indicating the object by use of a body part, such as a hand or a finger, or a tool, such as a pointer or a beam. Furthermore, a state where a visual line of the avatar is directed toward a certain object may be detected as the movement indicating the object. Such movement of the avatar results from an input made by the user using the input devices in the client device 300, such as the keyboard 6, the mouse 7 and the microphone 24, for designating the object to be indicated or the visual line of the avatar.

The user input that allows the avatar's movement indicating the object changes the state of the avatar displayed on the screen. Therefore, such an input may be transmitted to the different client devices 300 sharing the same space and thus transmitted to the server device 200. Meanwhile, the server device 200 may detect such movement of the avatar by monitoring the updated information on the avatar transmitted from the client device 300. The updated information on the avatar according to this embodiment includes the positional information and visual line information on the avatar and may further include at least one of identification information and pointing position information on the object designated by the user. The identification information or the pointing position information on the object may be handed over to the reference mark generation part 215 to be described later.

When the object is indicated by the visual line of the avatar, the movement detection part 205 may retrieve the indicated object from the management information storage part 250 on the basis of the positional information and visual line information on the avatar. Specifically, the movement detection part 205 draws a line in a visual line direction of the avatar from a current position of the avatar as a starting point and specifies an object that the line first comes up against as the indicated object. The identification information on the object retrieved from the management information storage part 250 may be handed over to the reference mark generation part 215 to be described later.

It is desirable that the movement detection part 205 detect a state where an input from the user of the client device 300 allows the avatar to indicate the object for at least a certain period of time. By using a condition that the object is indicated for at least a certain period of time, the movement detection part 205 may no longer erroneously detects movement of the avatar or the user operation to select the object for purposes other than indicating the object. Note that there may be a case where the movement of the avatar is detected more than once before a certain period of time passes, and pointing positions detected or specified in the detection are not the same. However, even in such a case, the pointing position last detected may be regarded as one indicated by the avatar as long as different pointing positions are within a certain range such as the case where the same object or adjacent objects are designated, for example.

Instead of or in addition to the above, the movement detection part 205 may detect a state where predetermined keywords are included in a chat message input by the user of the client device 300, in the state where the input from the user of the client device 300 allows the avatar to indicate the object. Here, the predetermined keywords may be, for example, demonstrative pronouns such as "this", "there" and "over there". By using a condition that not only the object is indicated by the avatar but also the predetermined keywords are included in the chat message input by the user, the movement detection part 205 may no longer erroneously detect a user operation merely for looking at the object through the avatar.

A text-based or speech-based chat message input by the user may be required to be transmitted to the different client devices 300 sharing the same space and thus transmitted to the server device 200. Meanwhile, upon receipt of the chat message from the client device 300, the movement detection part 205 analyzes the chat message to determine whether or not demonstrative pronouns are included therein. In the case where the chat message is a text-based message, the chat message may be analyzed by character string (demonstrative pronoun) matching or by advanced text processing such as morphological analysis. Meanwhile, in the case where the chat message is a speech-based message, the chat message may be analyzed by speech recognition processing. Note that the movement detection part 205 may detect a state where the chat message is transmitted by the user of the client device 300, in the state where the object is indicated by the avatar regardless of whether or not the predetermined keywords are included in the chat message.

Note that the detection of the movement of the avatar by the movement detection part 205 can be performed by the same method as described above in the client device 300 related to the avatar. In the case of adopting a configuration to detect the movement of the avatar in the client device 300, event information about the detected movement of the avatar may be notified, as trigger information for the server device 200 to generate a reference mark to be put on the object, to the server device 200 (the movement detection part 205) from the client device 300.

In response to the detection of the movement of the avatar by the movement detection part 205, the message acquisition part 210 may acquire the chat message input by the user of the client device 300 before and after the object is indicated. As described above, the chat message input by the user may be transmitted to the different client devices 300 sharing the same space and thus transmitted to the server device 200. Meanwhile, the message acquisition part 210 may store the chat message transmitted to the server device 200 from the client device 300 for a certain period of time. Thereafter, in response to the detection of the movement of the avatar by the movement detection part 205, the message acquisition part 210 may retrieve the chat message from the client device 300 related to the detected avatar and acquire the chat message input by the user of the client device 300 before and after the object is indicated. The acquired chat message may be utilized as information for explaining the object.

Note that the acquisition of the chat message by the message acquisition part 210 can also be performed by the same method as described above in the client device 300. In the case of adopting a configuration to acquire the chat message in the client device 300, the acquired chat message may be notified, as a part of trigger information for generating a reference mark, to the server device 200 (the message acquisition part 210) from the client device 300.

In response to the detection of the movement of the avatar by the movement detection part 205, the reference mark generation part 215 may generate a reference mark to be put on the object. The reference mark generated by the reference mark generation part 215 may be a visible reference mark that can be actually seen near the object on the screen of the client device 300 or may be an invisible reference mark that cannot be actually seen. In either case, the reference mark generation part 215 may generate the reference mark by assigning an ID as an identifier to the reference mark and thus by maintaining the ID so as to be related to the object having the reference mark put thereon.

Note that the reference mark generation part 215 performs identification of the object having the reference mark put thereon on the basis of the identification information on the object handed over from the movement detection part 205 as described above. It is preferable that the reference mark generation part 215 hold at least one of: time at which the reference mark is generated, movement information about the movement of the avatar based on which the reference mark is generated, and avatar information on the avatar performing the movement, while relating at least one of the above to the generated reference mark. Moreover, the reference mark generation part 215 may store at least one of the above in the reference mark storage part 255.

FIG. 5 shows an example of a table of reference marks which are generated by the reference mark generation part 215 and which are to be stored in the reference mark storage part 255. The reference mark ID field stores the identifiers of the reference marks described above. The creation time field stores time at which each of the reference marks is generated by the reference mark generation part 215. The final reference time field stores time at which each of the reference marks is last referred to by an arbitrary client device 300. The reference frequency field stores the number of times the reference mark is referred to by the arbitrary client device 300. Note that, at the point when the reference mark is generated by the reference mark generation part 215, 0 is stored as an initial value in each of the final reference time field and the reference frequency field.

The object field stores object information about objects on which reference marks are to be put. The object information stored here may include object IDs as identifiers of the objects and pointing positions (X, Y, Z) at which the objects are indicated, respectively. In the case of specifying the object indicated by the visual line of the avatar, a point on a surface of the object that a line connecting the positional information on the avatar, i.e., the viewpoint coordinates of the avatar to the center of the object comes up against may be obtained and stored as the pointing position. Note that it is desirable that three-dimensional coordinates relative to the positions and directions of the objects be used as the pointing positions stored in the table of the reference marks, and that the pointing positions be enabled to correspond to changes in the positions of the objects.

The creator field stores creator information about an avatar (hereinafter referred to as a creator) which performs movement based on which the reference mark is generated. The creator information stored here may include a creator ID as an identifier of the creator and positional information and visual line information about the creator. The context field stores movement information about the movement of the avatar based on which the reference mark is generated. The movement information stored here may include types of movement and input values input to the client device 300 by the user before and after the movement.

The types TEXT and VOICE listed in the table shown in FIG. 5 represent detection of transmission of text-based and speech-based chat messages including demonstrative pronouns, respectively, as the movement of the avatar. The type STAY represents detection of movement indicating the object for a certain period of time or more by use of a body part or a tool as the movement of the avatar. In the column of context value, the chat messages acquired by the message acquisition part 210 may stored. Note that, as can be seen from the table shown in FIG. 5, chat messages are not necessarily acquired by the message acquisition part 210 in the case where the context is the type STAY. In such a case, the column of context value may be left blank.

The discarding part 220 discards from the reference mark storage part 255 at least one of the following reference marks: a reference mark that is less frequently referred to; a reference mark left for a certain period of time after generation thereof; and a reference mark left for a certain period of time after the final reference time. Thus, unpopular reference marks or old reference marks can be prevented from remaining on the objects for a long time.

The policy acquisition part 225 may receive in advance from the client device 300 a policy that defines a reference mark whose presence is wished to be notified by the client device 300 among the reference marks that are generated by the reference mark generation part 215, and then store the policy in the policy storage part 260. The policy acquired by the policy acquisition part 225 is described in detail later with reference to FIG. 7.

Based on the policy of each of the client devices 300, which is stored in the policy storage part 260, the reference mark notification part 230 may select the reference mark that meets the policy from the generated reference marks stored in the reference mark table. Thereafter, the reference mark notification part 230 may transmit to each of the client devices 300 a notification indicating the presence of the selected reference mark (hereinafter simply referred to as a reference mark notification). The reference mark notification transmitted by the reference mark notification part 230 may include: the reference mark ID, and desirably further includes: at least one of the creation time of the reference mark; the object information about the object on which the reference mark is to be put; the movement information about the movement of the avatar based on which the reference mark is generated; the creator information about the creator who has performed the movement; the reference frequency indicating the number of times the reference mark is referred to; and the final reference time indicating the time at which the reference mark is last referred to.

Here, the object information may include the object ID that is the identifier of the object and the pointing position (X, Y, Z) at which the object is indicated. The movement information may include the input value input to the client device 300 by the user before and after the movement. The creator information may include: the creator ID; and the positional information and the visual line information about the creator. Although described in detail later, the client device 300 which has received the reference mark notification may display the notification on the screen of the display device 11. As an example, the reference mark notification displayed on the screen may include the creation time of the reference mark, the creator information and the input value inputted to the client device 300 by the user before and after the movement based on which the reference mark is generated.

The operation information acquisition part 235 may receive from the client device 300 an event of a selection operation by the user of the client device 300 in response to the reference mark notification displayed on the screen of the client device 300. Here, the event of the selection operation to be received may includes the reference mark ID.

In response to receipt of the event of the selection operation by the operation information acquisition part 235, the updating part 240 uses the reference mark ID included in the event of the selection operation as a key to retrieve a corresponding reference mark from the table of the reference marks stored in the reference mark storage part 255. Thereafter, the updating part 240 updates the final reference time and the value of reference frequency of the corresponding reference mark.

Moreover, in response to receipt of the event of the selection operation by the operation information acquisition part 235, the updating part 240 updates at least one of positional information and visual line information on an avatar (hereinafter referred to as a watcher) related to the client device 300 that has transmitted the event of the selection operation. Here, the information may be stored in the management information storage part 250, so as to allow the user of the client device 300 that has transmitted the event of the selection operation to be guided by the object having the reference mark put thereon, the reference mark corresponding to the selected reference mark notification.

As an example, the updating part 240 may use the reference mark ID included in the event of the selection operation as a key to retrieve a corresponding reference mark from the table of the reference marks stored in the reference mark storage part 255. Thereafter, the updating part 240 reads a pointing position of an object of the corresponding reference mark and updates at least one of the positional information and visual line information on the watcher on the basis of the pointing position. Specifically, the updating part 240 updates at least one of the positional information and visual line information on the watcher so as to allow the pointing position to coincide with a visual line direction of the watcher.

Alternatively, the updating part 240 may read positional information and visual line information on a creator of the corresponding reference mark, and update at least one of the positional information and visual line information on the watcher by use of the read information. As an example, a position and a visual line of the creator of the reference mark when the object is pointed at may be automatically set as a position and a visual line of the watcher. However, in this case, it is required to make sure that the avatar that is the creator of the reference mark and the avatar that is the watcher do not come up against each other in the three-dimensional virtual reality space.

Note that, by including the creator information and the object information in the reference mark notification, it is also possible: to update the positional information or the visual line information of the watcher in the client device 300; and to guide the user of the client device 300, which has selected the reference mark notification, to the object having the reference mark put thereon, the reference mark corresponding to the selected reference mark notification. In this case, the updating part 240 acquires updated information on the avatar together with the event of the selection operation. Moreover, the updating part 240 updates, based on the updated information acquired, at least one of positional information and visual line information on the avatar related to the client device 300 that has transmitted the event of the selection operation, the information being stored in the management information storage part 250.

Figure 6:
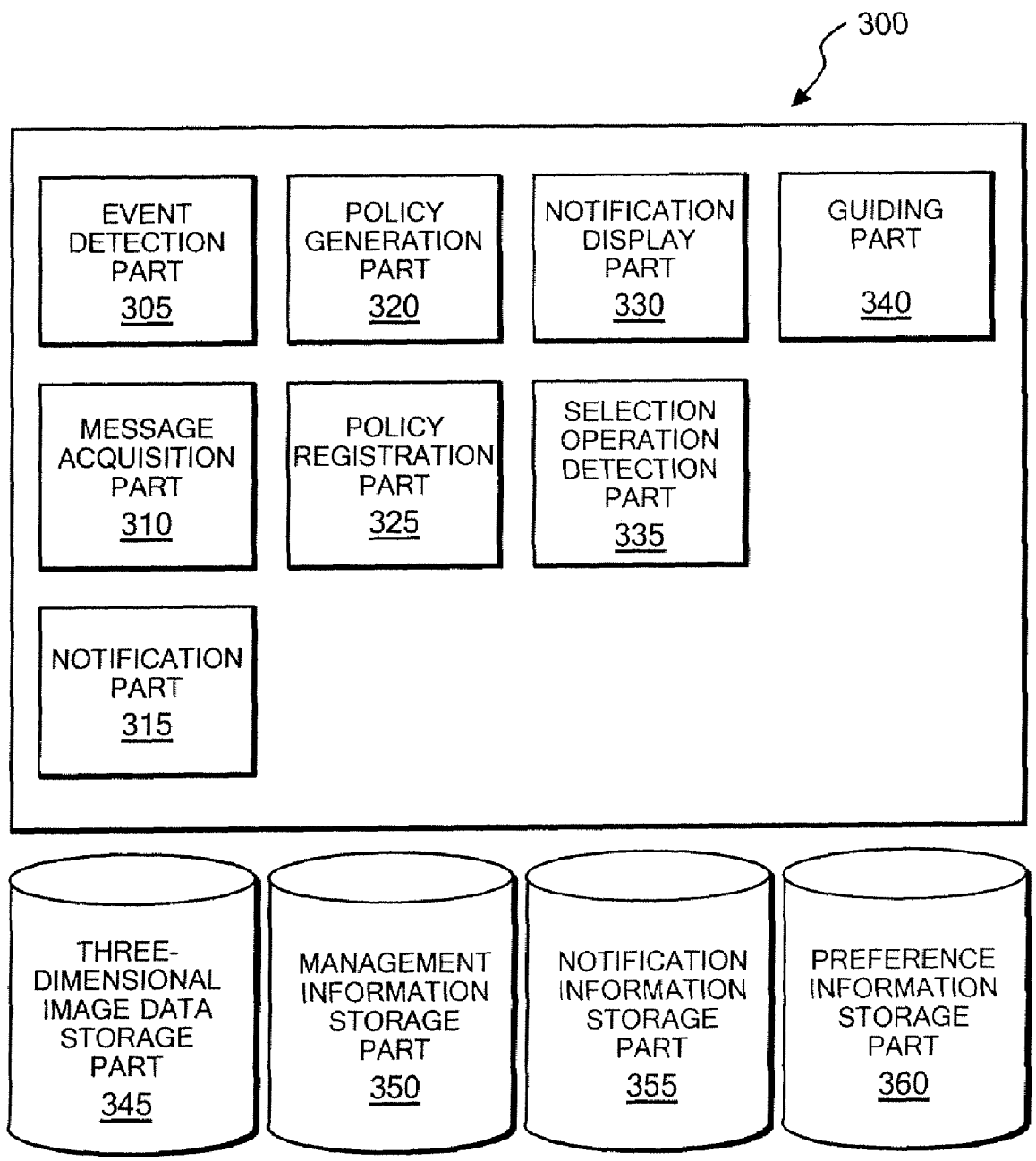
FIG. 6 shows an example of a functional configuration of the client device 300 according to an embodiment of the present invention.

FIG. 6 shows an example of a functional configuration of the client device 300 for automatically generating a reference mark according to the embodiment of the present invention. The client device 300 according to the embodiment of the present invention includes: an event detection part 305; a message acquisition part 310; a notification part 315; a policy generation part 320; a policy registration part 325; a notification display part 330; a selection operation detection part 335; and a guiding part 340. Moreover, one or more storage devices in the client device 300 according to the embodiment of the present invention may be configured as: a three-dimensional image data storage part 345; a management information storage part 350; a notification information storage part 355; and a preference information storage part 360. Note that, in the case where the movement of the avatar indicating the object in the three-dimensional virtual reality space is detected in the server device 200 as described above, the event detection part 305, the message acquisition part 310 and the notification part 315 may be excluded from the above functional configuration.

The three-dimensional image data storage part 345 may store three-dimensional image data whose state is not changed, such as a streetscape that constitutes the three-dimensional virtual reality space. The three-dimensional image data may be downloaded, region by region, from the server device 200, when the user visits a specific region in the three-dimensional virtual reality space for the first time. Alternatively, the three-dimensional image data may be read from storage media, such as a CD-ROM and a DVD-ROM, which are distributed to users of the service in advance.

The management information storage part 350 may store data on three-dimensional objects whose states can be changed and which are arranged in the three-dimensional virtual reality space. The management information storage part 350 may store the data on the three-dimensional objects, for example, by classifying the data into avatar information about avatars and object information about the different objects. Since these avatar information and object information are the same as those described with reference to FIGS. 3(a) and 3(b), description thereof will be omitted here.

The event detection part 305 may detect an event caused by an input from the user of the client device 300, the input indicating an object in the virtual reality space displayed on the screen of the client device 300. Since detailed description of a detection method is the same as that given of the movement detection part 205 in the server device 200, description thereof will be omitted here to avoid repetition.

In response to the event detection by the event detection part 305, the message acquisition part 310 may acquire a chat message input to the client device 300 by the user before and after the object is indicated. Since detailed description of message acquisition is the same as that given of the message acquisition part 210 in the server device 200, description thereof will be omitted here to avoid repetition.

In response to the event detection by the event detection part 305, the notification part 310 may notify the server device 200 of information about the detected event as trigger information for the server device 200 to generate a reference mark to be put on the object. Note that the event information to be notified to the server device 200 may include: types of events detected; at least one of identification information and pointing position information on an object designated by the user; and the chat message acquired by the message acquisition part 310 if any.

Here, the event types correspond to the context types described with reference to FIG. 5. Specifically, when the event detection part 305 detects transmission of a text-based or voice-based chat message including demonstrative pronouns as the event caused by the input from the user, the input indicating the object, the event type may be TEXT or VOICE. Meanwhile, when the event detection part 305 detects movement indicating the object for a certain period of time or more by use of a body part or a tool as the event caused by the input from the user, the input indicating the object, the event type may be STAY.

The policy generation part 320 may generate a policy that defines a reference mark whose presence is wished to be notified, based on the input from the user of the client device 300. Moreover, the policy registration part 325 may register the generated policy in the server device 200. FIGS. 7(a) to 7(c) show examples of policies generated by the policy generation part 320. The policy shown in FIG. 7(a) defines the reference mark whose presence is wished to be notified by defining a reference mark whose presence is not wished to be notified. "Ignore" represents that the policy is a definition of the reference mark whose presence is not wished to be notified. Moreover, the reference mark whose presence is not wished to be notified is defined by an ID of an avatar (<Avatar ID>) related to the client device 300 which transmits an event based on which a reference mark is generated, and by the type of the event (<Action>) based on which the reference mark is generated.

For example, in the first example shown in FIG. 7(a), for the avatar having the avatar ID 1234, a reference mark generated by detection of a voice-based chat message including demonstrative pronouns may be defined as a reference mark whose presence is not to be notified. Besides the above, TEXT or STAY described above can also be designated as <Action> in this embodiment.

Each of the policies shown in FIGS. 7(b) and 7(c) defines a reference mark whose presence is not wished to be notified or a priority of notification. In the policy shown in FIG. 7(b), SetAvatarPriority represents that the policy defines a priority of reference mark notification based on an avatar related to the client device 300 which transmits an event based on which a reference mark may be generated. Specifically, as in the first example shown in FIG. 7(b), a reference mark may be specified by the ID <Avatar ID> of the avatar related to the client device 300 which transmits the event based on which the reference mark is generated, and the priority of notification of the specified reference mark may be designated by the priority <Priority>. In this embodiment, any of IGNORE, LOW, MIDDLE and HIGH can be set in <Priority>. Moreover, all information about the set priority, except IGNORE, may be utilized as a part of information included in the reference mark notification to be transmitted to the client device 300.

In the policy shown in FIG. 7(c), SetActionPriority represents that the policy defines a priority of reference mark notification on the basis of the type of the event based on which a reference mark is generated. Specifically, as in the first example shown in FIG. 7(c), a reference mark may be specified by the type <Action Type> of the event based on which the reference mark is generated, and the priority of notification of the specified reference mark may be designated by the priority <Priority>. In this embodiment, VOICE, TEXT and STAY can be designated as <Action Type> as described above. In <Priority>, any of IGNORE, LOW, MIDDLE and HIGH can be set as described above. Moreover, all information about the set priority, except IGNORE, may be utilized as a part of information included in the reference mark notification to be transmitted to the client device 300.

The notification information storage part 355 may store the reference mark notification transmitted by the server device 200. As described above, the reference mark notification transmitted by the server device 200 may include: the reference mark ID, and desirably further includes: at least one of the creation time of the reference mark; the object information about the object on which the reference mark is to be put; the movement information about the movement of the avatar (creator) based on which the reference mark is generated; the creator information about the creator who has performed the movement; the priority information; the reference frequency indicating the number of times the reference mark is referred to; and the final reference time indicating the time at which the reference mark was last referred to.

Here, the object information may include: the object ID that is the identifier of the object; and the pointing position (X, Y, Z) at which the object is indicated. The movement information may include the input value inputted to the client device 300 by the user before and after the movement. The creator information may include: the creator ID; and the positional information and the visual line information about the creator.

The preference information storage part 360 may store preference information for determining a method for displaying the reference mark notification on the display screen of the client device 300. The preference information may be preset by the user of the client device 300, and registered in the client device 300. The preference information to be registered may be, for example, about the highlighting of at least one of the following reference marks prior to the different reference marks. Specifically, the reference marks to be highlighted may include: a last generated reference mark; a reference mark referred to by a different user; and a reference mark generated by an avatar with whom the last conversation is held in the virtual reality space or by an avatar present around the avatar of the client device 300.

The notification display part 330 may read the reference mark notification from the notification information storage part 355, and display the reference mark notification on the display screen of the client device 300. As an example, the notification display part 330 reads, from the information included in the reference mark notification, at least one of: the creation time of the reference mark; the creator information, the input value input to the client device 300 by the user before and after the movement; the reference frequency indicating the number of times the reference mark is referred to; and the final reference time indicating the time at which the reference mark was last referred to. Thereafter, the notification display part 330 may display the read information as the reference mark notification on the display screen of the client device 300.

Here, in the case where the creator information is displayed on the display screen of the client device 300, a nickname corresponding to the creator ID is desirably used. In the client device 300, a correspondence table between the avatar ID and the nickname may be acquired in advance from the server device 200. Moreover, in the case where the input value is displayed on the display screen of the client device 300, if the input value is a text-based chat message, the input value may be displayed as it is as character information. On the other hand, if the input value is a voice-based chat message, for example, an audio playback button for outputting the input value from the speaker 23 may be displayed on the display screen when the button is selected. Furthermore, if the input value is a chat message having at least a certain length, for example, a portion including demonstrative pronouns may be extracted from the chat message, and the extracted portion of the chat message may be used as the reference mark notification.

It is desirable that the notification display part 330 highlight or hide the reference mark notification that is read from the notification information storage part 355 on the display screen of the client device 300, by referring to the preference information stored in the preference information storage part 360. For example, if the preference information is about the highlighting of the last generated reference mark prior to the different reference marks, the notification display part 330 may read a reference mark having a relatively recent creation time, and display the reference mark large and bold on the display screen. Moreover, if the preference information is about the highlighting of the reference mark generated by the avatar with whom the last conversation is held in the virtual reality space prior to the different reference marks, the notification display part 330 may read, from the notification information storage part 355, a reference mark notification including the same creator ID as the ID of the avatar with whom the last conversation is held, and display the reference mark notification large and bold on the display screen.

Moreover, if the priority information (any of LOW, MIDDLE and HIGH) is included in the reference mark notification, the notification display part 330 may highlight or hide the reference mark notification that is read from the notification information storage part 355 on the display screen of the client device 300 according to the priority information. Furthermore, if a certain number or more of reference mark notifications are read from the notification information storage part 355, the notification display part 330 may hide some of the reference mark notifications according to the priority information.

The selection operation detection part 335 may detect a selection operation by the user of the client device 300 for the reference mark notification that is displayed on the display screen of the client device 300, and notify the server device 200 of an event of the selection operation. The event of the selection operation to be notified to the server device 200 may include the ID of the reference mark included in the reference mark notification selected.

In response to the selection operation detection by the selection operation detection part 335, the guiding part 340 may update at least one of the positional information and the visual line information on the client's (300) own avatar so as to guide the client's own avatar to the object having the reference mark put thereon, the reference mark corresponding to the selected reference mark notification. For example, the guiding part 340 may read a pointing position of the object, which is included in the selected reference mark notification, from the notification information storage part 355, and update at least one of the positional information and the visual line information on the client's own avatar on the basis of the pointing position. Alternatively, the guiding part 340 may read positional information and visual line information on the creator of the reference mark, the information being included in the selected reference mark notification, from the notification information storage part 355, and update at least one of the positional information and the visual line information on the client's own avatar by use of the read information.

Figure 8:
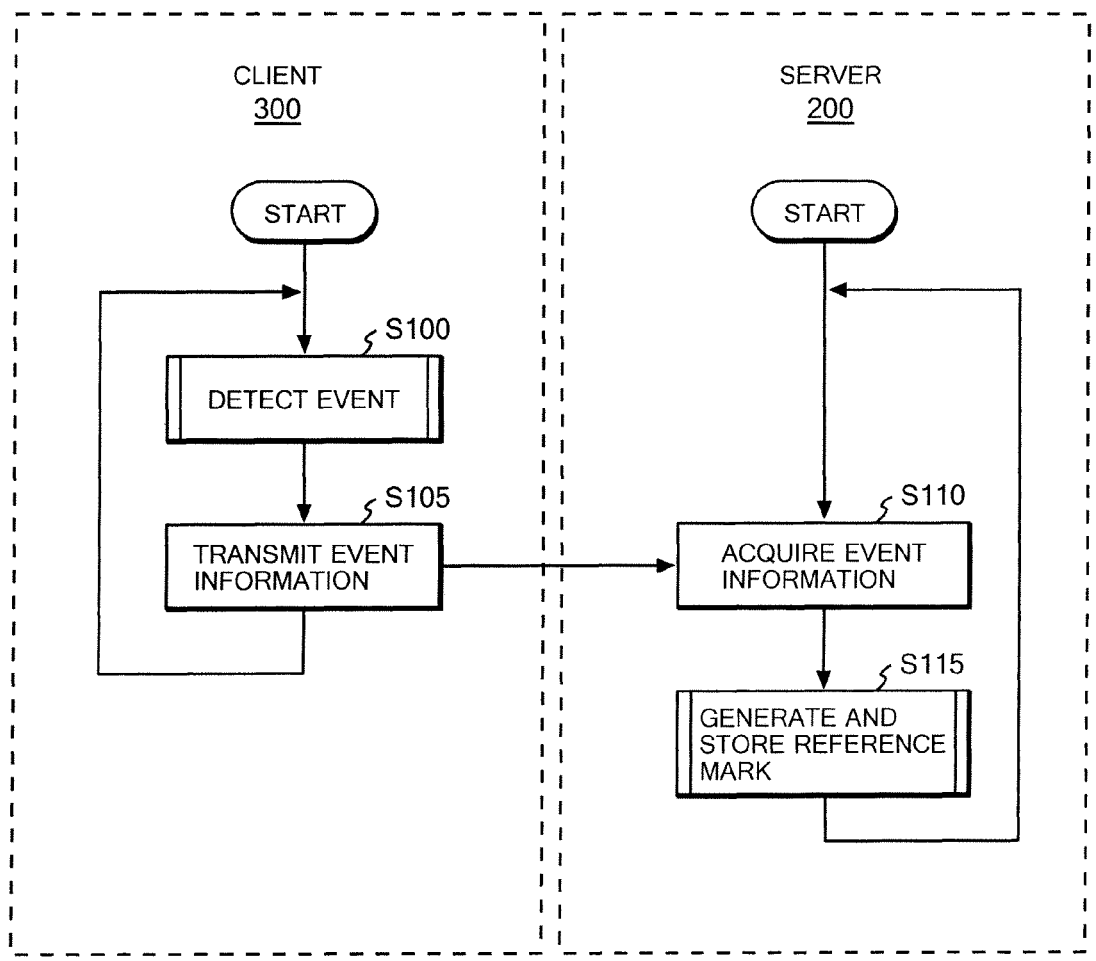
FIG. 8 is a flowchart showing an example of a flow of a process of automatically generating a reference mark according to an embodiment of the present invention.

Note that, in the case where the positional information or the visual line information on the client's own avatar is updated in the server device 200, the guiding part 340 receives the updated information on the avatar from the server device 200. Thereafter, the display screen of the client device 300 is redrawn, based on any one of or both of the updated positional information and visual line information on the avatar Next, with reference to FIGS. 8 to 15, description will be given of flows of processes of automatically generating a reference mark and guiding an avatar according to an embodiment of the present invention. Note that the description below is given on the assumption that the following two processes are performed in the client device 300: first, a process for detecting movement indicating an object, the movement serving as a trigger to generate a reference mark; and second, a process of guiding an avatar to a target object. It should be noted, however, that these processes can also be performed in the server device 200 as described above. FIG. 8 is a flowchart showing an example of a flow of a process of automatically generating a reference mark in the client device 300 and the server device 200. In FIG. 8, the process performed in the client device 300 may be started from Step 100 where the client device 300 detects an event caused by an input from the user of the client device 300, the input indicating an object in a three-dimensional virtual reality space that is displayed on the screen of the client device 300. The step of detecting the input event will be described in detail below with reference to FIGS. 9 and 10.

In response to the detection of the event, the client device 300 may transmit to the server device 200 information on the detected event as trigger information for the server device 200 to generate a reference mark to be put on the object (Step 105). The process performed in the server device 200 may be started from Step 110 where event information is acquired from the client device 300. The server device 200 generates the reference mark to be put on the object on the basis of the received event information, and stores the reference mark in the reference mark storage part 255 while relating the reference mark to the object (Step 115). The step of generating the reference mark will be described in detail below with reference to FIG. 11.

Figure 9:
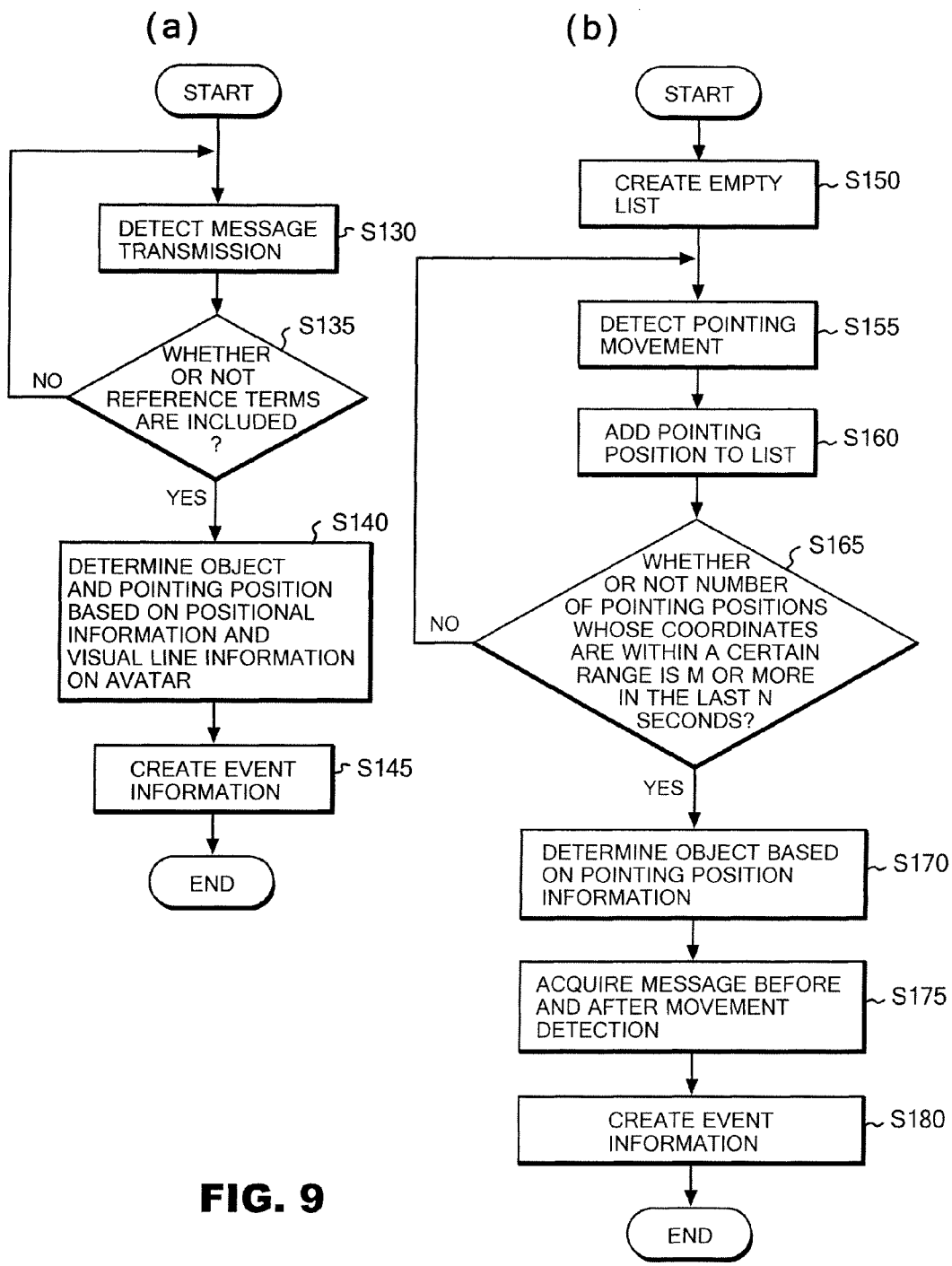
FIG. 9(a) is a flowchart showing an example of a flow of a process for detecting movement indicating an object according to an embodiment of the present invention.
FIG. 9(b) is a flowchart showing an example of a flow of a process for detecting movement indicating an object according to an embodiment of the present invention.

FIGS. 9(*a*) and 9(*b*) are flowcharts each showing an example of a flow of a process for detecting a user input that indicates the object in the client device 300. FIG. 9(*a*) is a flowchart showing an example of a flow of a process for detecting predetermined keywords in a chat message input by the user in a state where a visual line of an avatar related to the client device 300 is directed toward a certain object in the virtual reality space. In FIG. 9(*a*), the process may be started from Step 130 where transmission of a chat message is detected by the client device 300. In response to the detection of the transmission of the chat message, the client device 300 determines whether or not demonstrative pronouns are included in the transmitted chat message (Step 135). If no demonstrative pronouns are included in the chat message (Step 135: NO), the process returns to Step 130.

If it is determined in Step 135 that the demonstrative pronouns are included in the chat message, the client device 300 may read current positional information and visual line information on the client's own avatar from the management information storage part 350, and determine an object present in the visual line direction of the avatar and a pointing position thereof on the basis of the read information (Step 140). Thereafter, the client device 300 may create event information that may include: object information containing identification information on the determined object and the pointing position; and the chat message containing the demonstrative pronouns (Step 145), and then terminate the process. Note that a case where the chat message including the demonstrative pronouns is input in a state where the object is indicated by an input other than the visual line can be detected in the flowchart shown in FIG. 9(*b*) described below. Thus, here, the description is given of the case where the object is specified by the visual line of the avatar.

FIG. 9(*b*) is a flowchart showing an example of a flow of a process for detecting a state where the object displayed on the display screen of the client device 300 is indicated for at least a certain period of time. In FIG. 9(*b*), the process may be started from Step 150 where the client device 300 creates an empty list for sequentially recording positions at which the object is indicated by user inputs. Next, upon detection of a user input indicating the object (Step 155), the client device 300 adds coordinates of the pointing position in the three-dimensional virtual reality space to the list (Step 160). Thereafter, the client device 300 determines, by referring to the list, whether or not the number of pointing positions whose coordinates are within a certain range of the three-dimensional virtual reality space is M or more (M is an integer) in the last N seconds (N is an integer) (Step 165). If the number of the pointing positions is below M, the process returns to Step 155.

If YES in Step 165, the client device 300 determines an object present at the coordinates of the pointing position as an object on which a reference mark is to be put (Step 170). Next, the client device 300 acquires chat messages transmitted before and after detection of pointing movement by referring to a history of chat messages transmitted by the user of the client device 300 (Step 175). Thereafter, the client device 300 creates event information that includes: object information containing identification information on the determined object and the pointing position; and the chat messages (Step 180), and then terminates the process.

Figure 10:
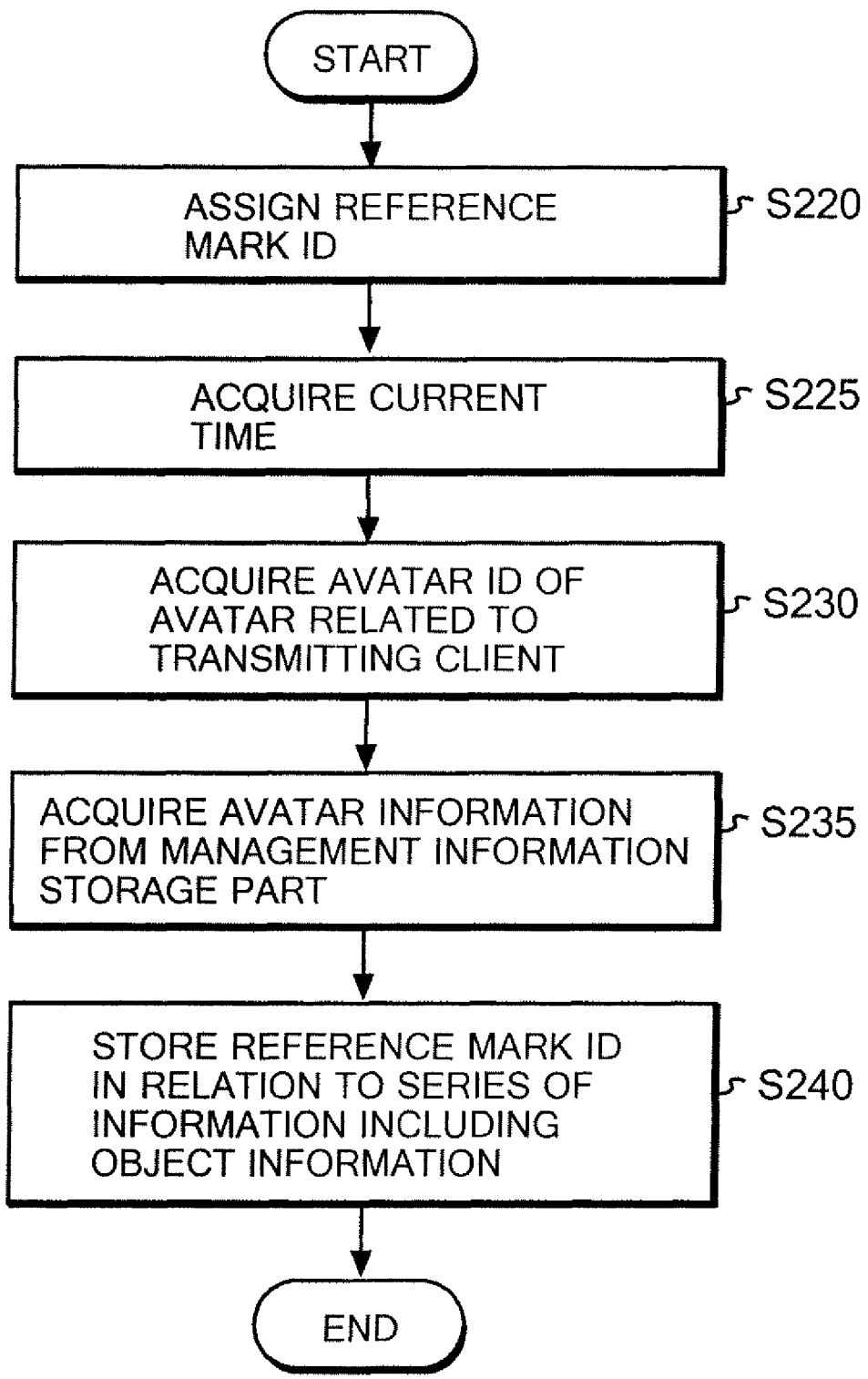
FIG. 10 is a flowchart showing an example of a flow of a reference mark generation process according to an embodiment of the present invention.

FIG. 10 is a flowchart showing an example of a flow of a reference mark generation process in the server device 200. In FIG. 10, the process may be started from Step 220 where the server device 200 assigns an ID to a reference mark to be generated in response to receipt of the event information. Thereafter, the server device 200 acquires current time and sets the current time as creation time of the reference mark (Step 225). Subsequently, the server device 200 acquires an ID of an avatar related to the client device 300 that has transmitted the event, as an ID of a creator of the reference mark (Step 230). Here, for acquisition of the avatar ID, a correspondence table between an identifier (for example, an IP address or a serial number) of the client device 300 and the avatar ID may be used, for example. Specifically, the correspondence table may be managed in the server device 200. Alternatively, the server device 200 may acquire the avatar ID from the client device 300 as a part of the event information.

Thereafter, the server device 200 uses the avatar ID as a key to acquire corresponding avatar information from the management information storage part 250 (Step 235). Here, the server device 200 determines positional information and visual line information on the avatar, which are included in the acquired avatar information, as positional information and visual line information on the creator of the reference mark. The server device 200 may store in the reference mark storage part 255 a series of information described above together with the object information included in the event information while relating the information to the reference mark ID, and then terminate the process.

Figure 11:
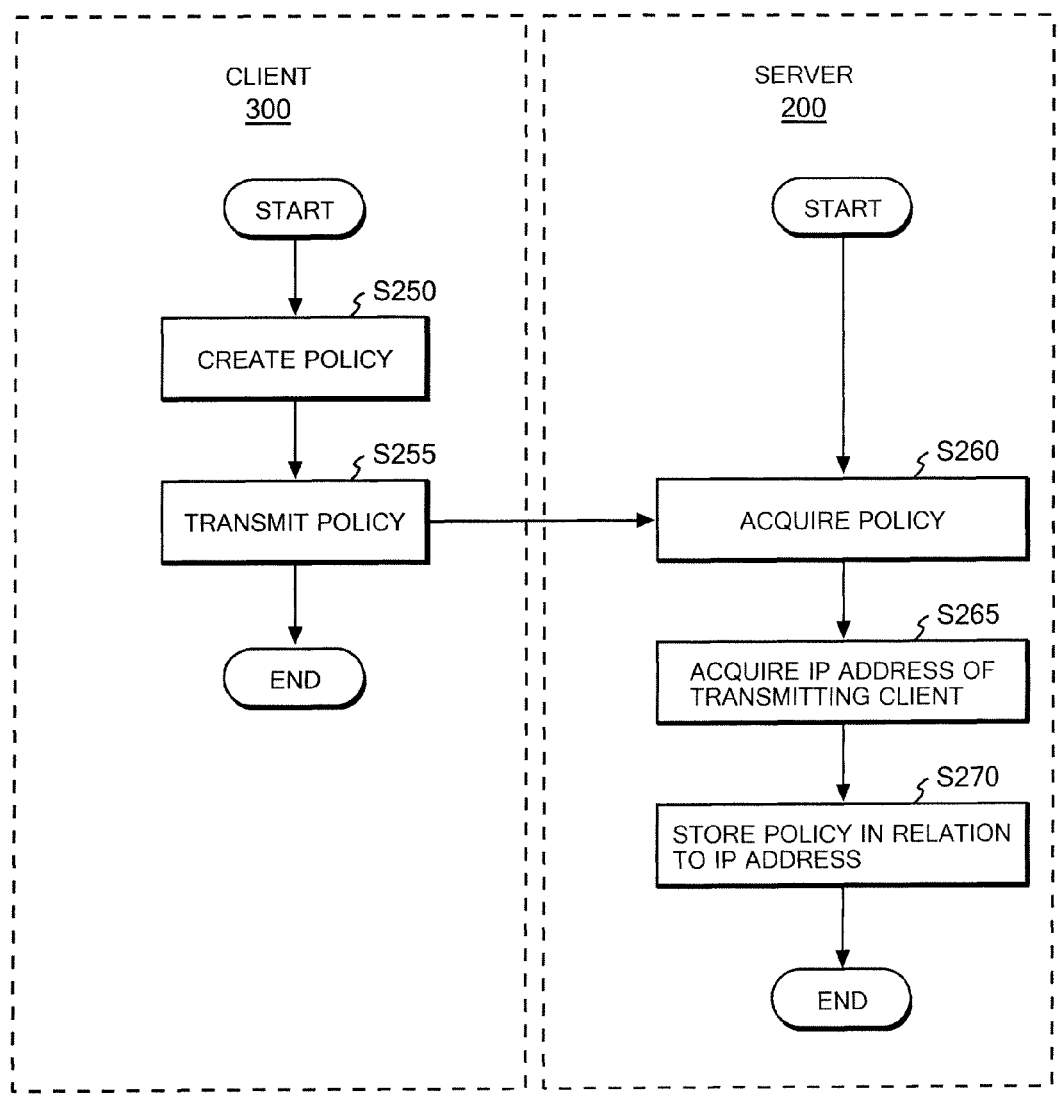
FIG. 11 is a flowchart showing an example of a flow of processes for creating and retaining policies according to an embodiment of the present invention.

FIG. 11 is a flowchart showing an example of a flow of processes for creating and managing policy information in the client device 300 and the server device 200. In FIG. 11, the process performed in the client device 300 may be started from Step 250 where the client device 300 creates a policy that defines a reference mark wished to be notified. Thereafter, the client device 300 transmits the created policy to the server device 200 (Step 255), and then terminates the process. Meanwhile, the process in the server device 200 may be started by acquisition of the policy from the client device 300 in Step 260. The server device 200 acquires an IP address of the client device 300 that has transmitted the policy (Step 265). Thereafter, the server device 200 stores the received policy in the policy storage part 260 while relating the policy to the IP address (Step 270), and then terminates the process.

Figure 12:
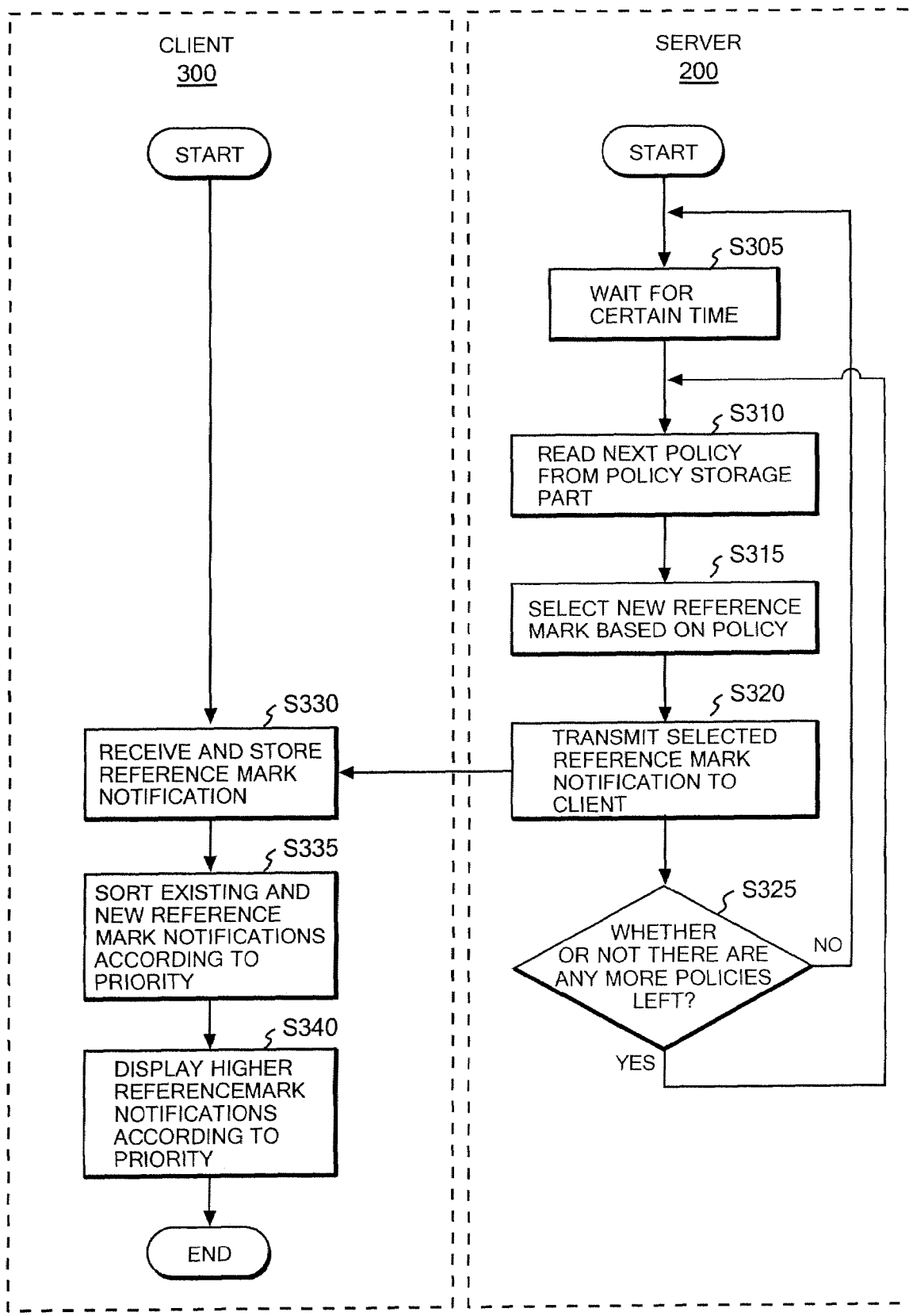
FIG. 12 is a flowchart showing an example of a flow of a process for notifying the presence of the reference mark according to an embodiment of the present invention.

FIG. 12 is a flowchart showing an example of a flow of a reference mark notification process in the client device 300 and the server device 200. In FIG. 12, the process in the server device 200 may be started from Step 305 where the server device 200 waits for a certain period of time. After a lapse of a certain period of time, the server device 200 reads a policy from the policy storage part 260 (Step 310), and selects a newly generated reference mark that meets conditions of the read policy from multiple reference marks stored in the reference mark storage part 255 (Step 315). Next, the server device 200 uses the information stored in the reference mark storage part 255 to create a reference mark notification indicating the presence of the reference mark for each of the selected reference marks. Thereafter, the server device 200 transmits the created reference mark notification to the client device 300 that has transmitted the read policy (Step 320). Subsequently, the process proceeds to Step 325 where the server device 200 determines whether or not there are policies left to be processed in the policy storage part 260. If there are policies left to be processed (Step 325: YES), the process returns to Step 310, and the server device 200 repeats a series of steps from Step 310 to Step 320 for the unprocessed policies. On the other hand, if there are no more policies left to be processed (Step 325: NO), the process returns to Step 305, and the server device 200 repeats a series of steps in the server device 200 shown in FIG. 12.

Meanwhile, the process in the client device 300 may be started by acquiring the reference mark notification from the server device 200 and by storing the reference mark notification in the notification information storage part 355 in Step 330. Every time a newly generated reference mark notification is received from the server device 200, the existing notification stored in the notification information storage part 355 and the newly received notification may be sorted based on priority information included in the notification by the client device 300 (Step 335). If the number of the reference mark notifications exceeds a certain number, the client device 300 displays only higher reference mark notifications on its display screen (Step 340). In this event, the client device 300 may highlight or hide the reference mark notification according to the priority included in the notification or by referring to the preference information stored in the preference information storage part 360 (Step 340). Thereafter, the process may be terminated.

Figure 13:
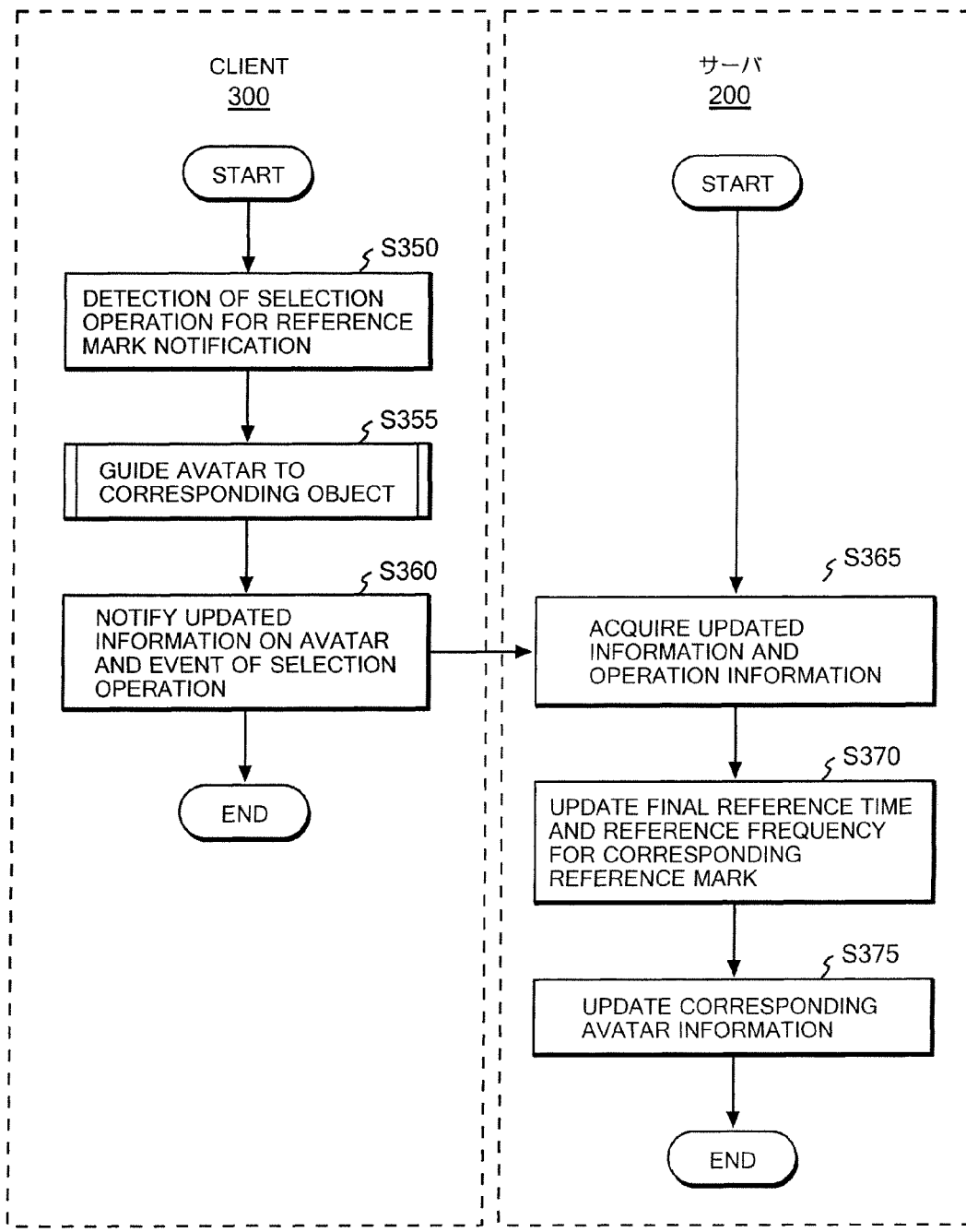
FIG. 13 is a flowchart showing an example of a flow of an avatar guiding process according to an embodiment of the present invention.

FIG. 13 is a flowchart showing an example of a flow of a process of guiding to the object having the reference mark put thereon in the client device 300 and the server device 200. In FIG. 13, the process in the client device 300 may be started from Step 350 where the client device 300 detects a selection operation by the user for the reference mark notification displayed on the display screen. In response to the detection of the selection operation, the client device 300 guides its own avatar to the object having the reference mark put thereon, the reference mark corresponding to the selected notification (Step 355). The step of guiding the avatar to the object will be described in detail later with reference to FIG. 14. Thereafter, the client device 300 notifies the server device 200 of an event of the selection operation and the information on the avatar updated by the guiding step (Step 360), and then terminates the process.

Meanwhile, the process in the server device 200 may be started by acquiring the event of the selection operation and the information on the avatar updated by the guiding step from the client device 300 in Step 365. The server device 200 uses the reference mark ID included in the event of the selection operation as a key to retrieve a corresponding reference mark from the table of the reference marks stored in the reference mark storage part 255. Thereafter, the server device 200 updates the final reference time and the value of reference frequency of the corresponding reference mark (Step 370). Subsequently, the server device 200 updates the positional information or the visual line information on the avatar related to the client device 300 that has transmitted the event of the selection operation, the information being stored in the management information storage part 250, based on the acquired updated information on the avatar (Step 375). Thereafter, the process is terminated.

Figure 14:
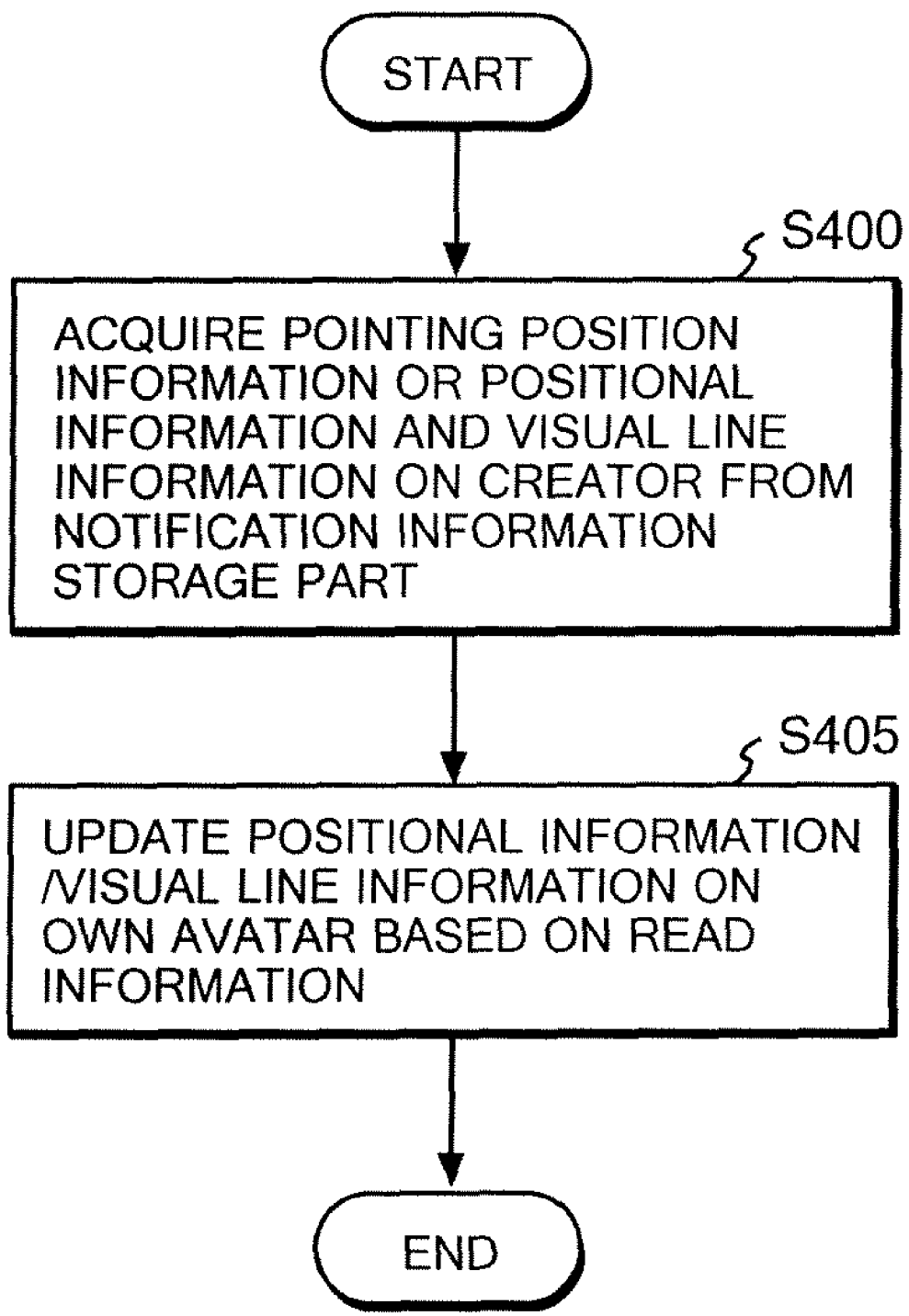
FIG. 14 is a flowchart showing an example of a flow of an avatar information updating process according to an embodiment of the present invention.

FIG. 14 is a flowchart showing an example of a flow of a process of guiding to the object in the client device 300. In Step 400, the client device 300 may read, from the notification information storage part 355, the pointing position of the object, which may be included in the selected reference mark notification. Thereafter, the client device 300 may update at least one of the positional information and visual line information on the own avatar on the basis of the read pointing position of the object (Step 405), and then terminates the process. Alternatively, the client device 300 may read the positional information or visual line information on the creator of the reference mark, the information being included in the selected reference mark notification, from the notification information storage part 355, and update at least one of the positional information and visual line information on the own avatar by use of the read information.

Figure 15:
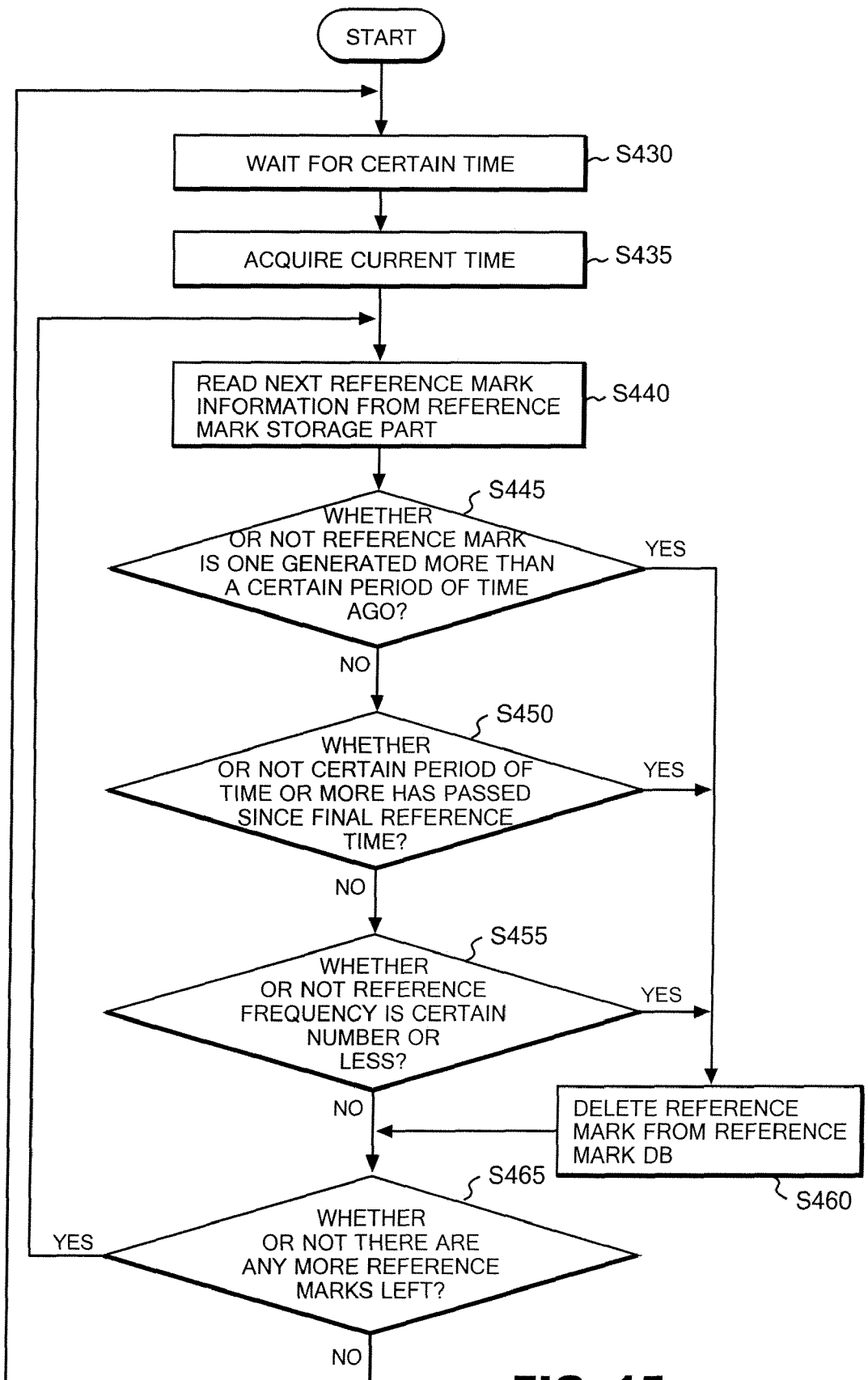
FIG. 15 is a flowchart showing an example of a flow of a reference mark discarding process according to an embodiment of the present invention.

FIG. 15 is a flowchart showing an example of a flow of a reference mark discarding process in the server device 200. In FIG. 15, the process may be started from Step 430 where the server device 200 waits for a certain period of time. After a lapse of a certain period of time, the server device 200 acquires current time (Step 435) and reads information on the next reference mark from the reference mark storage part 255 (Step 440). Thereafter, the server device 200 determines, based on the creation time of the reference mark, whether or not the read reference mark is an old reference mark generated more than a certain period of time before the current time (Step 445). If the read reference mark is not old (Step 445: NO), the server device 200 next determines, based on the final reference time of the reference mark, whether or not a certain period of time or more has passed since the last time the read reference mark was referred to (Step 450). If the certain period of time has not passed since the last reference of the reference mark (Step 450: NO), the server device 200 further determines, based on the reference frequency of the reference mark, whether or not the read reference mark is frequently referred to (Step 455).

If a positive determination result is obtained in any of Steps 445, 450 and 455, in other words, if the reference mark is old or not very popular, the server device 200 may delete the reference mark from the reference mark storage part 255 (Step 460). On the other hand, in the case where negative determination results are obtained in all of Steps 445, 450 and 455, in other words, the reference mark is relatively new and popular or the case where the process proceeds to Step 465 from Step 460, the server device 200 may determine whether or not there are undetermined reference marks left in the reference mark storage part 255. If there are undetermined reference marks left (Step 465: YES), the process returns to Step 440 and the server device 200 repeats a series of steps from Step 440 to Step 465 for the undetermined reference marks. On the other hand, if there are no more undetermined reference marks left (Step 465: NO), the process returns to Step 430 and the server device 200 repeats a series of steps shown in FIG. 15.

Figure 17:
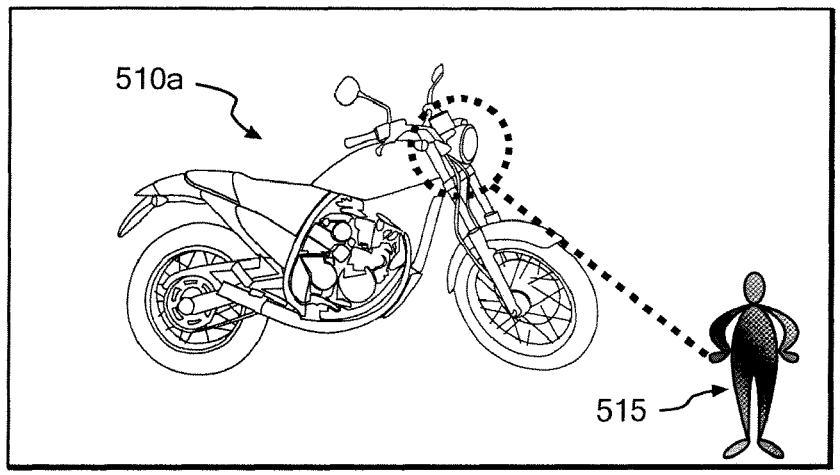
FIG. 17(a) shows an example of a display screen of a client device 300 of a salesman according to an embodiment of the present invention.
FIG. 17(b) shows an example of the display screen of the client device 300 of the salesman according to an embodiment of the present invention.
FIG. 17(c) shows an example of the display screen of the client device 300 of the salesman according to an embodiment of the present invention.
Figure 17:
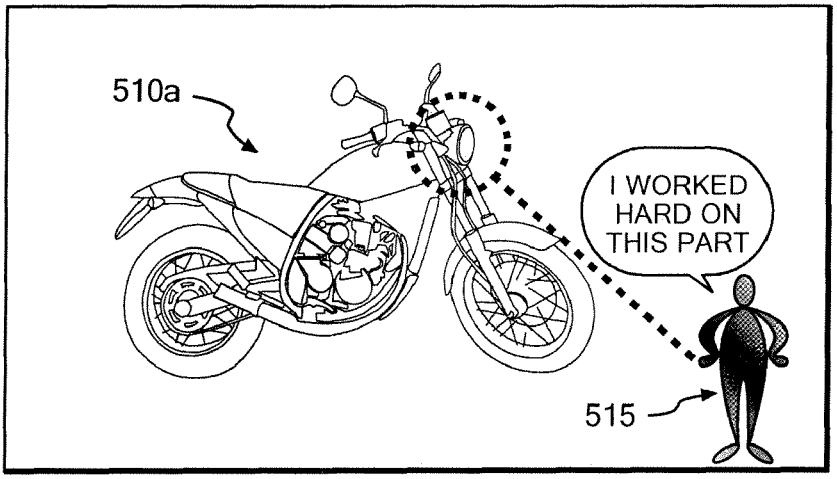
Figure 17:
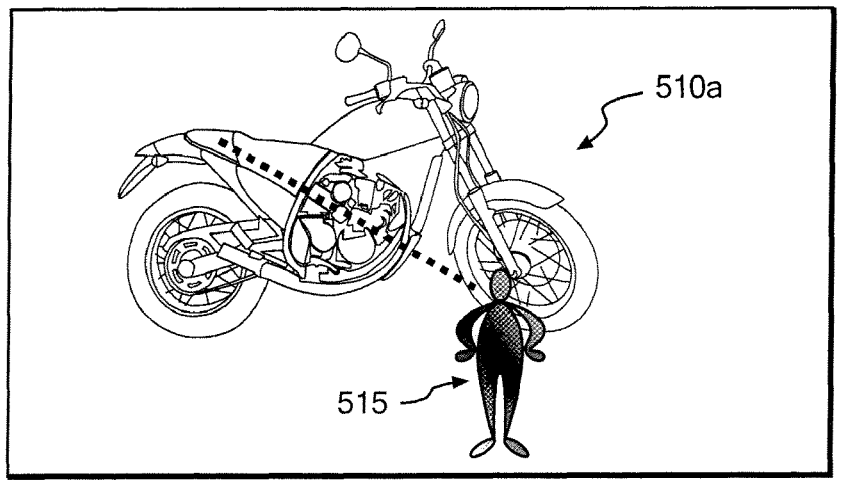
Figure 18:
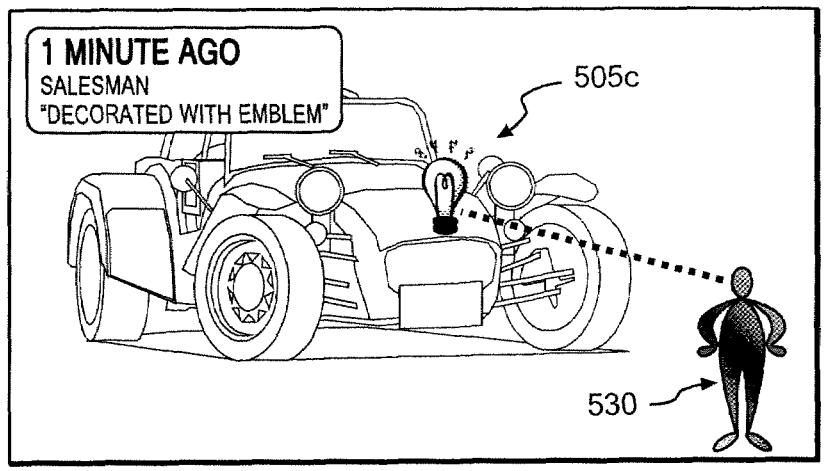
FIG. 18(a) shows an example of a display screen of a client device 300 of Grandpa according to an embodiment of the present invention.
FIG. 18(b) shows an example of the display screen of the client device 300 of Grandpa according to an embodiment of the present invention.
FIG. 18(c) shows an example of the display screen of the client device 300 of Grandpa according to an embodiment of the present invention.
Figure 18:
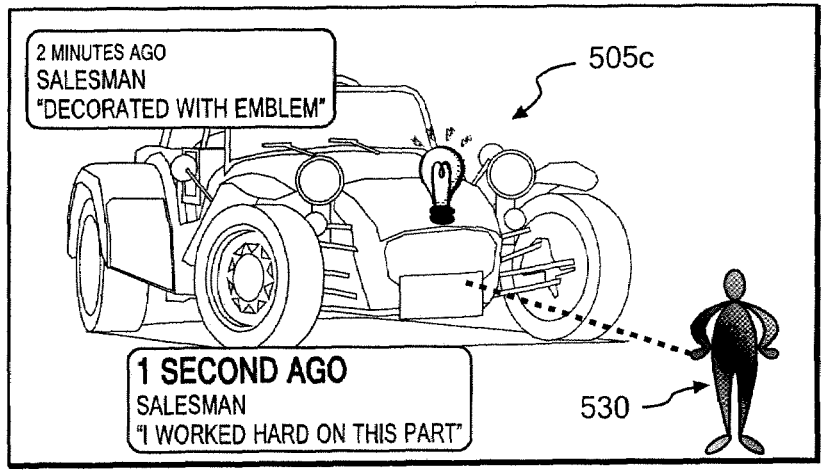
Figure 18:
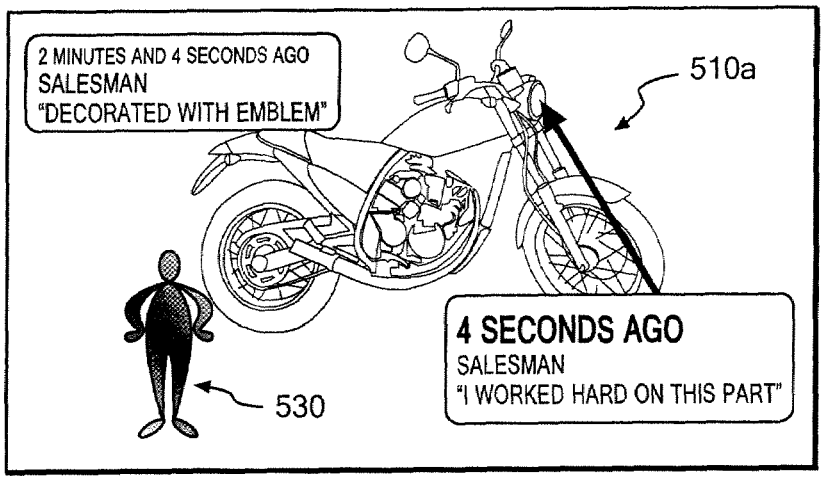

Next, with reference to FIGS. 16 to 18, description will be given of contents displayed on the display screen of the client device 300 when the present invention is applied, by taking a motor vehicle show held in a three-dimensional virtual reality space as an example.

Figure 16:
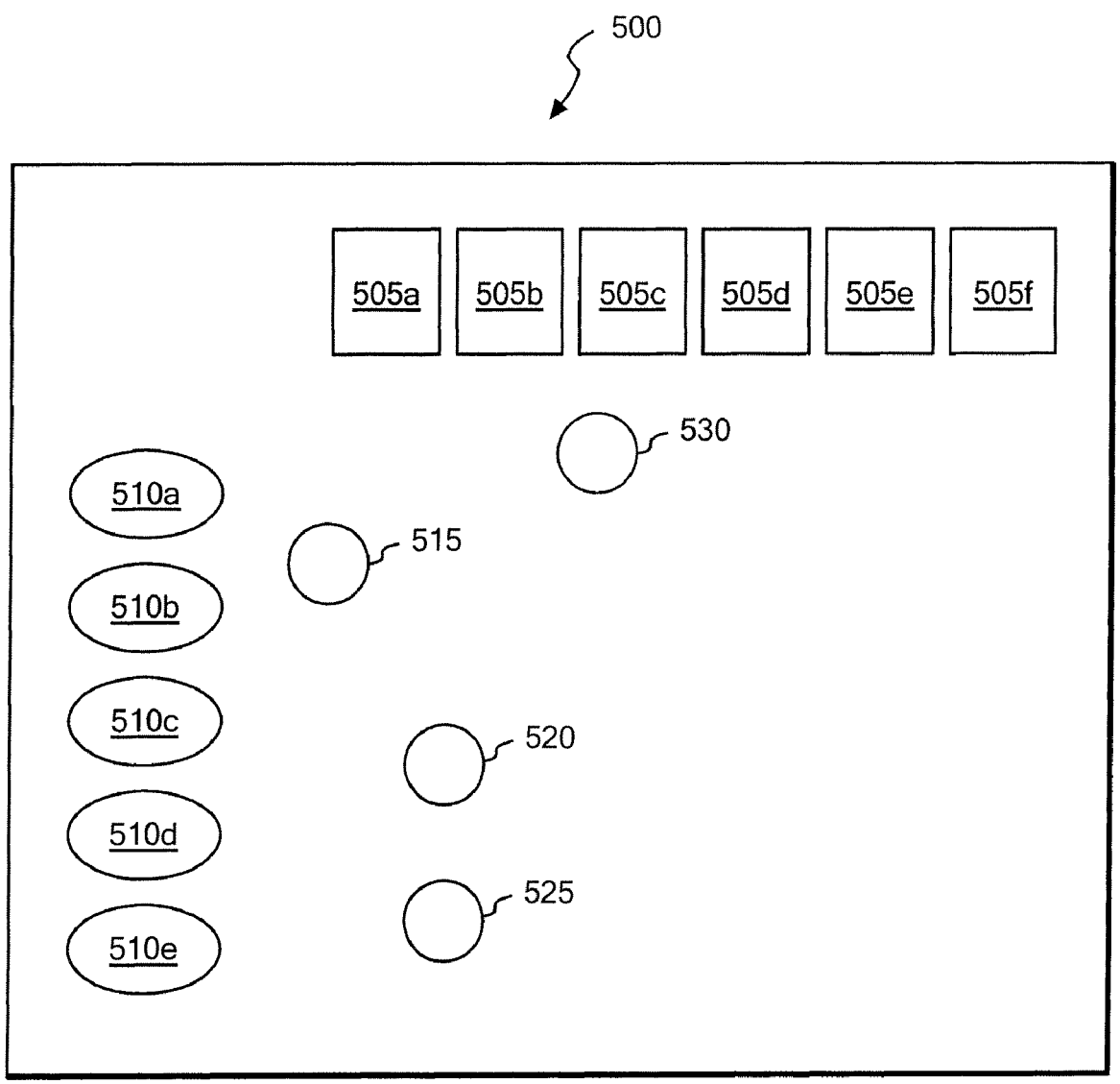
FIG. 16 shows a certain site of a motor vehicle show in a three-dimensional virtual reality space.

FIG. 16 shows a certain site of the motor vehicle show. In the site shown in FIG. 16, six cars 505a to 505f and five motorcycles 510a to 510e are exhibited, and avatars indicated by reference numbers 515, 520, 525 and 530 have gathered in the site. Here, the avatar 515 has a nickname "Salesman", and is related to a client device 300 of a salesman who explains the exhibited articles to the avatars 520, 525 and 530 as visitors. The avatar 530 has a nickname "Grandpa", and is related to a client device 300 that is the visitor. In the following description, attention will be focused on display screens of the salesman related to the avatar 515 and of Grandpa related to the avatar 530.

FIGS. 17(a) to 17(c) show the display screen of the salesman's client device 300. On the display screen of the salesman's client device 300, there is displayed a three-dimensional motor vehicle show site viewed from the avatar 515 as shown in FIG. 16. When the salesman uses his input device to make the avatar 515 perform movement indicating a part of the motorcycle 510a, a beam extended to the indicated part of the motorcycle from a hand of the avatar 515 is displayed on the display screen of the salesman as shown in FIG. 17(a). When the salesman inputs a chat message "I worked hard on this part" by use of the input device and transmits the message in the above state, the display screen of the salesman may be changed from FIG. 17(a) to FIG. 17(b). Note that the dotted line surrounding a part of the motorcycle 510a may not be displayed on the actual display screen of the salesman. Thereafter, the salesman moves the avatar to the left on the screen by use of the input device, and starts explaining the next part of the motorcycle 510a. In this event, the display screen of the salesman may be changed from FIG. 17(b) to FIG. 17(c).

Assuming that it takes a certain period of time (for example, 20 seconds) for the display screen to be changed from FIG. 17(a) to FIG. 17(b), the salesman's client device 300 according to the embodiment of the present invention may detect a state where a part of the motorcycle 510a displayed on the display screen is pointed at for at least a certain period of time. In response to the detection of the pointing movement, the salesman's client device 300 may determine an object to be pointed at, i.e., the motorcycle 510a on the basis of pointing position information. Furthermore, the salesman's client device 300 may acquire a chat message input before and after the pointing movement, i.e., the chat message "I worked hard on this part" from a history of chat messages saved in the salesman's client device 300. The salesman's client device 300 may create event information including an ID of the motorcycle 510a, the pointing position information and the chat message "I worked hard on this part", and transmit the event information to the server device 200.

Note that, if a part of the motorcycle 510a is indicated by a visual line of the avatar 515, the salesman's client device 300 may detect the pointing movement of the avatar 515 by detecting that a demonstrative pronoun "here" is included in the chat message. In this case, the salesman's client device 300 may retrieve the indicated object from the management information storage part 350 on the basis of positional information and visual line information on the avatar 515.

Upon receipt of the event information from the salesman's client device 300, the server device 200 may generate a reference mark to be put on the motorcycle 510a on the basis of the event information. Thereafter, the server device 200 may store the generated reference mark in the reference mark storage part 255 while relating the reference mark to: object information including the creation time, the ID of the motorcycle 510a and the pointing position; creator information including the ID of the salesman's avatar 515, and the current positional information and visual line information of the salesman; and the chat message "I worked hard on this part".

Meanwhile, let Grandpa's client device 300 related to the avatar 530 register in advance in the server device 200 "SetAvatarPriority Avatar 515's ID HIGH" as a policy that defines a reference mark wished to be notified. The server device 200 regularly selects a new reference mark that meets Grandpa's policy from the reference mark storage part 255, and transmits a notification of the selected reference mark to Grandpa's client device 300. The reference mark notification in this embodiment may include: creation time of the reference mark; the object information containing the object ID and the pointing position; the creator information containing the creator ID, the positional information and the visual line information; and the transmitted chat message.

FIGS. 18(a) to 18(c) show the display screen of Grandpa's client device 300. On the display screen of Grandpa's client device 300, there is displayed a three-dimensional motor vehicle show site viewed from the avatar 530 as shown in FIG. 16. FIG. 18(a) shows the display screen of Grandpa's client device 300 when the display screen of the salesman's client device 300 is FIG. 17(a). On the display screen of Grandpa's client device 300, there is highlighted in boldface a notification of a first reference mark that is generated 1 minute ago on the basis of the movement of the salesman's avatar 515. Note that the arrow 550 drawn from the reference mark notification indicates an object on which a reference mark is to be put. Grandpa is assumed to be interested in a car 505c and keep looking at an emblem of the car 505c, even after the salesman moved on to explanation of the motorcycle 510a.

Thereafter, when the movement of the salesman's avatar 515 pointing at a part of the motorcycle 510a is used as a trigger to generate a second reference mark in the server device 200, Grandpa's client device 300 receives a notification indicating the presence of the second reference mark from the server device 200. Moreover, the display screen of Grandpa's client device 300 may be changed from FIG. 18(a) to FIG. 18(b). Here, let Grandpa register in advance in the client device 300 preference information for determining prioritized display of a newer reference mark. According to the registered preference information, Grandpa's client device 300 displays the notification of the previously created first reference mark in shaded and small font and displays the notification of the newly created second reference mark in bold and large font as shown in FIG. 18(b). Note that the received reference mark notifications are stored in the notification information storage part 355.

Note that the client device 300 according to this embodiment displays the creation time of the reference mark, the nickname of the creator and the chat message as the reference mark notification on the display screen. Here, the creation time of the reference mark may be displayed as it is or may be displayed by obtaining the time that has passed since the current time as shown in FIGS. 18(a) to 18(c). When Grandpa is interested in the notification of the second reference mark and wishes to look at the indicated object, he may just select the second reference mark displayed on the display screen by clicking on the reference mark. In response to detection of the selection operation, Grandpa's client device 300 may read the creator information included in the notification of the selected reference mark from the notification information storage part 355, and update positional information and visual line information on Grandpa's avatar 530 by using the positional information and visual line information on the creator. As a result, the display screen of Grandpa's client device 300 may be changed from FIG. 18(b) to FIG. 18(c).

Moreover, Grandpa's client device 300 reads the reference mark ID included in the selected reference mark notification from the notification information storage part 355, and transmits to the server device 200 an event of the selection operation including the reference mark ID together with the updated information on the avatar. In response to receipt of the event of the selection operation, the server device 200 updates the reference frequency and the final reference time of the reference mark. Moreover, by use of the updated information on the avatar, the server device 200 updates the information stored in the management information storage part 250.

As described above, according to the present invention, the movement of the avatar related to the client device 300, the movement indicating the object in the virtual reality space displayed on the screen of the client device 300, may be detected as the trigger information for generating a reference mark. Moreover, in response to the detection of the movement, a reference mark to be put on the object may be generated. Thus, the user can put the reference mark on the object without performing a complicated operation such as inputting a command to instruct generation of a reference mark.

Moreover, on the screen of the client device 300, there is displayed a notification of the presence of the reference mark corresponding to the policy information registered in advance in the server device 200 by the client device 300, among the automatically generated reference marks. Thus, the user of the client device 300 can recognize the presence of the reference mark the user is interested in regardless of whether or not the object having the reference mark put thereon is displayed on the screen. Furthermore, when the reference mark notification displayed on the screen is selected by the user, the visual line information or positional information of the avatar is updated so as to allow the user to see the object having the reference mark put thereon. Thus, the user can surely see the object on which the reference mark the user is interested in is put.

According to the present invention, the movement of the avatar related to the client device, the movement indicating the object in the virtual reality space displayed on the screen of the client device, may be detected as the trigger information for generating a reference mark. Moreover, in response to the detection of the movement, a reference mark to be put on the object may be generated. Thus, the user can put the reference mark on the object without performing a complicated operation such as inputting a command to instruct generation of a reference mark.

Moreover, a notification of the presence of the reference mark corresponding to policy information registered in advance in the server device by the client device, among the automatically generated reference marks, may be displayed on the screen of the client device. Thus, the user of the client device can recognize the presence of the reference mark the user is interested in, regardless of whether or not the object having the reference mark put thereon is displayed on the screen. Furthermore, when the reference mark notification displayed on the screen is selected by the user, the visual line information or positional information on the avatar may be updated so as to allow the user to see the object having the reference mark put thereon. Thus, the user may be able to see the object on which the reference mark the user is interested in is put.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

I claim:

1. A virtual reality system comprising:
   a computer server configured to create a virtual reality space;
   a movement detector on the computer server configured to detect movement of a first avatar on one of a plurality of computers connected to the computer server in a network, wherein the first avatar points to the virtual reality space;
   a reference marker on the computer server configured to mark each of a plurality of objects with a reference mark in the virtual reality space;
   a reference marker storage system that stores creation time of the reference marker, information about one of the plurality of objects on which the
   reference marker is to be put, movement information about the movement of the first avatar, and avatar information about the first avatar, and
   wherein the reference marker is generated based on the movement information about the movement of the first avatar; and
   a guidance system configured to guide a second avatar on one of the plurality of computers to each of the plurality of objects pointed to by the first avatar in response to a user's selecting on a screen display a notification of the presence of the reference marker; and
   a policy system configured to register a policy in advance to the computer server by one of the plurality of computers, the policy defining one of the reference markers whose presence the one of the plurality of computers wishes to be notified of;
   a notification system configured to select one of the reference markers that meets the policy, and notify the plurality of computers of the presence of the selected reference marker;
   an information acquisition system configured to acquire from one of the plurality of computers a selection operation which one of the plurality of computers performs in response to a reference marker notification displayed on a screen; and
   an updating system configured to update positional information and line information of a second avatar to guide the second avatar to one of the reference markers.

2. The virtual reality system of claim 1, wherein the first avatar points to each of the plurality of objects for a predetermined time interval.

3. The virtual reality system of claim 1, wherein a user uses predetermined keywords in a chat message to cause the first avatar to point to one of the plurality of objects.

4. The virtually reality system of claim 3, wherein the chat message is stored.

5. The virtual reality system of claim 1, wherein the notification system notifies the plurality of computers of the creation time of the selected reference mark that satisfies the predetermined policy, information about the object marked with the selected reference mark that satisfies the predetermined policy, and information about the first avatar including information about movement of the first avatar.

6. The virtual reality system of claim 1, wherein the storage system stores a value representing the number of times the reference mark of each of the plurality of objects is pointed to by the first avatar or by the second avatar, and the time when the reference mark of each of the plurality of objects was last referred to by the first avatar or by the second avatar.

7. The virtual reality system of claim 1, including a discarding system that discards the reference mark if said reference mark is not referred to for a predetermined time interval.

8. The virtual reality system of claim 1, including a response system wherein a user of one of the plurality of computers changes the location of the second avatar in response to information about the first avatar.

9. The virtual reality system of claim 7, wherein the discarding system is configured to discard the reference mark if said reference mark was created before a predetermined date.

10. A method comprising:
detecting movement of a first avatar on one of a plurality of computers connected to a computer server;
marking an object pointed to by the first avatar with a reference marker in a virtual reality space; and
storing creation time of the reference marker, information about one of the object on which the reference marker is to be put, movement information about the movement of the first avatar, and avatar information about the first avatar;
generating the reference marker based on the movement information about the movement of the first avatar;
guiding a second avatar on one of the plurality of computers to the object pointed to by the first avatar in response to a user's selecting on a screen display a notification of the presence of the reference marker;
registering a policy in advance to the computer server by one of the plurality of computers, the policy defining a reference marker whose presence the one of the plurality of computers wishes to be notified of;
selecting the generated reference marker if the generated reference marker meets the policy, and notifying the plurality of computers of the presence of the selected reference marker;
acquiring from one of the plurality of computers a selection operation which one of the plurality of computers performs in response to a reference marker notification displayed on a display screen; and
updating positional information and line information on a second avatar to guide the second avatar to the selected reference marker.

11. A computer program product stored on a non-transitory computer readable medium, including:
computer program code configured to detect movement of a first avatar on one of a plurality of computers connected to a computer server;
computer program code configured to mark one of a plurality of objects with a reference mark in a virtual reality space pointed to by the first avatar;
computer program code configured to store creation time of the reference mark, information about one of the plurality of objects on which the reference mark is to be put, movement information about the movement of the first avatar, and avatar information about the first avatar;
computer program code configured to generate the reference mark based on the movement information about the movement of the first avatar;
computer program code configured to guide a second avatar on one of the plurality of computers to the marked object pointed to by the first avatar; and
computer program code configured to highlight or hide a notification to a plurality of users of the presence of previous reference marks.
computer program code configured to register a policy in advance to the computer server by one of the plurality of computers, the policy defining a reference mark whose presence the one of the plurality of computers wishes to be notified of;
computer program code configured to select the generated reference mark if it the generated reference marker meets the policy, and notifying the plurality of computers of the presence of the selected reference mark;
computer program code configured to acquire from one of the plurality of computers a selection operation which one of the plurality of computers performs in response to a reference mark notification displayed on a display screen; and
computer program code configured to update positional information and line information on a second avatar to guide the second avatar to the selected reference mark.

12. The computer program product of claim 11, including computer program code configured to display on a screen of one of the plurality of computers a notification of the presence and location of the reference mark.

13. The computer program product of claim 12, wherein the notification of the presence and location of the reference mark is so displayed for a predetermined time interval.

14. The computer program product of claim 11, including computer program code configured to use predetermined keywords in a chat message to cause the first avatar to point to the marked object.

15. The computer program product of claim 11, including computer program code configured to notify the computer server about the contents of a chat message.

16. The computer program product of claim 11, including computer program code configured to display on a screen of one of the client computers the reference mark of one of the plurality of objects.

* * * * *